United States Patent
Joyce et al.

(10) Patent No.: US 7,426,484 B2
(45) Date of Patent: Sep. 16, 2008

(54) CONSOLIDATED SHIPPING AND DISTRIBUTION OF MULTIPLE ORDERS WITH RETURNS

(75) Inventors: Robert F. Joyce, Alpharetta, GA (US); Gary Alan Smith, Peachtree City, GA (US); Daniel B. Thornton, Louisville, KY (US)

(73) Assignee: United Parcel Service of America, Inc., Atlanta, GA (US)

( * ) Notice: Subject to any disclaimer, the term of this patent is extended or adjusted under 35 U.S.C. 154(b) by 976 days.

(21) Appl. No.: 10/357,971

(22) Filed: Feb. 4, 2003

(65) Prior Publication Data

US 2004/0153379 A1 Aug. 5, 2004

(51) Int. Cl.
*G06Q 10/00* (2006.01)

(52) U.S. Cl. .................. 705/28; 705/22; 340/5.92; 235/385

(58) Field of Classification Search ............. 705/26–28, 705/22; 340/5.92; 235/385
See application file for complete search history.

(56) References Cited

U.S. PATENT DOCUMENTS

| | | | |
|---|---|---|---|
| 5,694,551 A | 12/1997 | Doyle et al. | |
| 5,712,789 A | 1/1998 | Radican | |
| 5,758,329 A | 5/1998 | Wojcik et al. | |
| 6,061,607 A | 5/2000 | Bradley et al. | |
| 6,078,900 A | 6/2000 | Ettl et al. | |
| 6,148,291 A * | 11/2000 | Radican ........................ | 705/28 |
| 6,167,378 A | 12/2000 | Webber, Jr. | |
| 6,249,774 B1 * | 6/2001 | Roden et al. ................... | 705/28 |
| 6,289,260 B1 | 9/2001 | Bradley et al. | |
| 6,418,416 B1 | 7/2002 | Rosenberg et al. | |
| 6,448,886 B2 * | 9/2002 | Garber et al. .............. | 340/10.1 |
| 6,536,659 B1 | 3/2003 | Hauser et al. | |
| 6,648,153 B2 | 11/2003 | Rosenberg et al. | |
| 6,721,762 B1 * | 4/2004 | Levine et al. ............ | 707/104.1 |
| 2001/0027471 A1 | 10/2001 | Paulose et al. | |
| 2001/0034673 A1 | 10/2001 | Yang et al. | |
| 2002/0010661 A1 | 1/2002 | Waddington et al. | |
| 2002/0016715 A1 | 2/2002 | Razumov | |
| 2002/0019759 A1 | 2/2002 | Arunapuram et al. | |
| 2002/0038266 A1 | 3/2002 | Tuttrup et al. | |

(Continued)

FOREIGN PATENT DOCUMENTS

JP 05-165847 7/1993

(Continued)

*Primary Examiner*—F. Zeender
*Assistant Examiner*—Vanel Frenel
(74) *Attorney, Agent, or Firm*—Alston & Bird, LLC

(57) ABSTRACT

The present invention provides systems and methods of consolidating, shipping and distributing items comprising multiple orders to multiple customers. The orders are received by an inventory management service, filled and packaged at a centralized distribution center in fewer containers than there are orders. For instance, if there are N orders destined for a particular authorized outlet, then the N orders will be consolidated and shipped in at most N−1, or fewer, containers. However, each order is individually packaged, controlled, tracked and received as an individual order. The consolidated containers are shipped to an authorized outlet and the individual orders are distributed to the customers. Also provided are systems and methods for returning orders that are not picked up at the authorized outlet to a central location. The items may be, for example, service parts, wireless communication devices, etc. Warehousing, shipping and transportation costs are reduced by this invention.

47 Claims, 9 Drawing Sheets

U.S. PATENT DOCUMENTS

| | | |
|---|---|---|
| 2002/0042735 A1 | 4/2002 | Narahara et al. |
| 2002/0059121 A1 | 5/2002 | Schneider et al. |
| 2002/0070846 A1* | 6/2002 | Bastian et al. ............. 340/5.92 |
| 2002/0082954 A1 | 6/2002 | Dunston |
| 2002/0099631 A1 | 7/2002 | Vanker et al. |
| 2002/0107744 A1 | 8/2002 | Rosenberg et al. |
| 2002/0107820 A1 | 8/2002 | Huxter |
| 2002/0123944 A1 | 9/2002 | Williams et al. |
| 2002/0124389 A1 | 9/2002 | Matson |
| 2002/0128957 A1 | 9/2002 | Rosenberg et al. |
| 2002/0130065 A1 | 9/2002 | Bloom |
| 2002/0133415 A1 | 9/2002 | Zarovinsky |
| 2002/0152128 A1 | 10/2002 | Walch et al. |
| 2002/0153994 A1 | 10/2002 | Bonner et al. |
| 2002/0175606 A1 | 11/2002 | Holmes |
| 2002/0177922 A1 | 11/2002 | Bloom |
| 2002/0178074 A1 | 11/2002 | Bloom |
| 2003/0037009 A1 | 2/2003 | Tobin et al. |
| 2003/0083964 A1* | 5/2003 | Horwitz et al. ................ 705/28 |
| 2003/0212602 A1* | 11/2003 | Schaller ....................... 705/22 |
| 2004/0128204 A1* | 7/2004 | Cihla et al. ................... 705/26 |

FOREIGN PATENT DOCUMENTS

| | | |
|---|---|---|
| JP | 08-307545 | 11/1996 |
| JP | 11-175621 | 7/1999 |
| WO | WO 01/18712 A1 | 3/2001 |
| WO | WO 02/07021 A2 | 1/2002 |

* cited by examiner

PACK SLIP

Report Date: 28-Jan-2003

Tracking Identifier: 1Z0XNG1234567890
Carrier: UPS  X    FedEx ____  Airborne ____  Other/Specify ____
Level of Service: Ground  X    Next Day ____

Delivery Date: 29-Jan-2003

Ship From:
IMS Co.'s DC
DC Street
Bldg. 2
Washington, DC 12345

Shipping Instructions: _____
_____

Ship To:
Mr. John Doe
Authorized Outlet # 1234 — 612
123 Main Street
Richmond, VA 54321

Order Reference: _____

Sub Package Identifier: 1A2B-456XYZ

Account Name:
BIG COMPUTER FIXIT, Co.

| Part # | Description | Qty | Vendor Serial # | Vendor Lot # | Rev Level | LPN/ OSN | Location | Line Reference |
|---|---|---|---|---|---|---|---|---|
| PR2-7123-000-98788 | CAN ROLL DEL MIDDLE NP6050 | 1 | | | 0 | 3280876779 | G.03.1.02. | 4004744 Y |
| FYI-1157-000-98789 | CLEANEW SUPPLY ROLL | 2 | | | 0 | 320960121 | IKL.5.C.1 | 4110475 Y |
| | TOTAL QTY | 3 | | | | | | |

*End of Data**

FIG. 6

CONSOLIDATED SHIPPING AND DISTRIBUTION OF MULTIPLE ORDERS WITH RETURNS

CROSS-REFERENCE TO RELATED APPLICATIONS

Not applicable.

FEDERALLY SPONSORED RESEARCH OR DEVELOPMENT

Not applicable.

REFERENCE TO SEQUENCE LISTING, A TABLE, OR A COMPUTER PROGRAM LISTING APPENDIX SUBMITTED ON A COMPACT DISC

Not applicable.

BACKGROUND OF THE INVENTION

1. Field of the Invention

The present invention relates generally to systems and methods for the consolidated shipment and distribution of ordered items to one or more users by utilizing authorized outlets and for the return of items from authorized outlets.

2. Description of Related Art

When ordering an item a customer will generally place an order with a vendor. The vendor will fulfill the order from their on-hand inventory, package the order and ship it (individually) to the customer's residence or business.

This method of order fulfillment has several drawbacks. It is a highly labor-intensive process and one in which many vendors may not be adequately equipped to handle. Individual fulfillment of each order and separate shipment to a residence can be expensive because of the packaging labor and material for each order and the higher residential shipping rates.

To address some of the problems some entities began to aggregate multiple customer orders from a localized area, consolidate the multiple orders into as few shipping containers as possible, and deliver them to a common location near the customers for pick-up. Such systems are described in the following publications.

U.S. patent application Ser. No.: 09/765,769, "Order Aggregation System for International Shipments," filed Jan. 18, 2001 by Paulose et al. claiming benefit of a provisional application filed Jan. 18, 2000, and published Oct. 4, 2001 describes an aggregation system for aggregating multiple orders from different customers into a single shipment. It describes a method of aggregating products for international shipment to customers (presumably retail customers although this is not stated in the application). The application discloses a product delivered to a shipping location combined with other product to be shipped in the same shipment in a single shipping container. However, it does not contemplate the distribution of the product at an authorized outlet.

U.S. patent application Ser. No.: 09/791,481, "Electronic Marketplace Providing Service Parts Inventory Planning and Management," filed Feb. 22, 2001 by Yang et al. and assigned to i2 Technologies, Inc., claiming benefit of a provisional application filed Feb. 22, 2000, and published on Oct. 25, 2001 describes a system used for service parts logistics. The application discloses distributors maintaining service parts inventory within supply chains such that they can supply service parts to one or more customers at a suitable level in response to demand from customers. Each distributor may have a multi-echelon supply chain with larger more centralized distribution centers supplying smaller more geographically dispersed distribution centers. However, the consolidated shipment and tracking of the service parts is not contemplated. The '481 application also describes the return of service parts that are processed through a 'reverse logistics' or other returns supply chain for eventual insertion back into the supply chain. Typically, a customer will return service parts to the particular distribution center from which the service parts were originally supplied.

U.S. patent application Ser. No.: 09/855,558, "Method and Apparatus for Effective Distribution and Delivery of Goods Ordered on the World Wide Web," filed May 16, 2001 by Tuttrup et al. claiming the benefit of a provisional application filed Jul. 7, 2000, and published on Mar. 28, 2002 describes a method for delivering goods ordered by a plurality of customers. The method includes the steps of a plurality of customers placing orders for goods from a vendor; the vendor fulfilling its orders by combining into a single shipping order the goods ordered by a plurality of customers who are geographically close to a single local pick-up; and the vendor causing the single shipping order to be sent to a local pick-up point. The '558 application does not contemplate the use of an inventory management service to fulfill orders nor is an authorized outlet where distribution of the ordered goods described.

U.S. patent application Ser. No.: 09/758,943, "Single Courier Model for the Delivery of Goods Ordered by the Internet," filed Jan. 10, 2001 by Huxter as a continuation-in-part of an application filed Dec. 1, 2000, and published on Aug. 8, 2002, describes the use of an automated collection point for delivering goods. The system may segregate pending deliveries into groups, with each group of deliveries assigned to a distinct automated collection point. In embodiments of the invention, the groups are selected so that the customers corresponding to each group reside within the vicinity of the corresponding collection point. However, the use of tracking and control systems is not described, nor is the distribution of orders at attended authorized outlets.

The above inventions generally disclose systems and methods of shipping and distributing goods from a vendor to a customer. Some describe the use of a common, localized collection point for collection of the ordered items by the customers. In order to track such consolidated shipments, each customer with an individual order in the consolidated shipment would have to be provided the tracking number of the consolidated shipping container. However, there would be no assurance to the customer that their order was actually in the consolidated shipment until it is opened at the local distribution center. Furthermore, an inventory management service company or other service parts provider may want confirmation that a customer for billing and other purposes has received an order. Such confirmation is not available in the previously described systems.

Therefore, systems and methods are needed to address the challenges associated with the selection, aggregation, sortation, consolidation, shipment, tracking, control, and distribution of items ordered by a customer and the return of items that are exchanged for new or replacement devices.

BRIEF SUMMARY OF THE INVENTION

The present invention provides for a system and method of consolidating, shipping and distributing items comprising multiple orders to multiple customers. The orders are filled and packaged in fewer containers than there are orders. For instance, if there are N orders destined for a particular authorized outlet, then the N orders will be consolidated and shipped in at most N−1, or fewer, containers. However, each order is individually packaged, controlled, tracked and received as an individual order. The consolidated containers are received at an authorized outlet and the individual orders are distributed to the customers.

The present invention will reduce costs incurred in warehouse processing and supplies, such as by reducing pick time, reducing material handling, and reducing packaging supplies. It will also reduce transportation costs by both reducing the number of separate packages shipped as well as utilizing commercial delivery rates versus residential rates. Also proposed are systems and methods for returning orders that are not retrieved at the authorized outlet to a central location. Furthermore, all of the concepts allow tracking of what orders have been delivered or returned, who picked up the orders and when, all while reducing the frequency of delivery failures caused by a delivery service failing to meet an intended recipient.

Specifically, orders are received at by an inventory management service ("IMS") from a customer and are forwarded to a centralized distribution center ("DC") for fulfillment. A customer is associated with an authorized outlet. An authorized outlet is a localized distribution center where the customer retrieves the order. By utilizing authorized outlets, the number of delivery points is reduced, thereby reducing delivery costs. Each authorized outlet is assigned an identification code or number. An authorized outlet may be, for example, a retail location such as Mail Boxes Etc. ("MBE"), a UPS Supply Chain Solutions facility, an unattended facility that allows secure exchange of items, etc.

Customers' orders are received at a DC in various ways, such as through an EDI link, a web site, printer, fax, email, phone, regular mail, etc. The DC can fill these orders using internal inventory, third party inventory, or directly from vendors. As the orders are received they are recorded in an information system, such as inventory management system, order management system, warehouse management system, billing system, spreadsheet, manual paper system, etc., or any combination of such systems. This information system is used to maintain transactional information and inventory control, as well as to produce all necessary control reports or logs such as, for example, warehouse pick tickets, packing slips/manifests, control sheets, etc.

Each order from a given customer of a given account will be linked to an authorized outlet. Linking the customer with an authorized outlet may be accomplished in several ways. The first way is when each customer is assigned to a specific authorized outlet. As an example, consider the management of the distribution of parts to service technicians. Each technician may be assigned to a certain area, thus they will normally retrieve their orders from a particular authorized outlet. In this case, when an order for this particular technician/customer, the information system used will automatically search the database and link a customer's ID to the specific authorized outlet where the customer has been assigned. Another example is where the customer can specify the authorized outlet where the customer would like the order shipped. In another embodiment, each authorized outlet could be assigned a geographic area and orders placed in that geographic area will be shipped to the assigned authorized outlet.

Each order placed by a customer will have an indicator of the transportation mode/carrier (e.g., package carrier, freight, etc) and service level (e.g., next day, ground, etc.) to be used.

Order information will then be stored (accumulated) in the information system of the DC and released at a scheduled pick time in a warehouse picking method such as, for example, a wave picking method. An order control function at the DC is responsible for the flow of information of all orders. Order control will manage order consolidation and then give consolidated order pick slips to an order picker function. The order picker function will pick orders by utilizing efficient warehouse picking methods. The picked items are either brought to a shipment staging area to be sorted and assembled by order for packing and shipping or are picked by order and then prepared for packing and shipping.

The picked items are assembled into sub-packages. Each sub-package is associated with one order in the consolidated package. An order may have more than one line item (an item number with quantity greater or equal to one).

An order shipper function creates a packing slip/manifest for each order (sub-package). The packing slip/manifest for each order identifies the items that comprise the order, a customer identifier, a unique order number or sub-package identifier, and a tracking identifier of a shipping container in which the order will be consolidated with other orders for shipment to an authorized outlet. Each unique sub-package identifier within a consolidated package is linked to a shipping tracking identifier of the consolidated package. That is, all sub-packages within a consolidated package will have unique sub-package identifiers that are linked to the same tracking identifier. Therefore, each sub-package may be tracked and controlled as if it were an individually shipped package.

Generally, all sub-packages designated for one account at one particular specific authorized outlet will be placed into one master container. However, depending on the dimensions, weight limitations, and number of accounts serviced from that authorized outlet, an authorized outlet may receive more than one consolidated package.

The order packer function attaches a shipping label to the consolidated package (master container). Along with the master container, a control sheet is included either manually and/or electronically (for example, it could be included in the container in a tangible form or it could be electronically mailed to the designated authorized outlet). The control sheet is comprised of at least the following information: authorized outlet ID, carrier, tracking identifier, number of customers, sub-package IDs (order number) and customer identifiers (e.g., names of customers). The consolidated package may also have a return tracking label to be used (if necessary) for the consolidated return of sub-packages not retrieved by customers. The consolidated package is shipped to an authorized outlet via a shipping service.

An authorized outlet may receive an electronically transmitted prior notification (i.e., an Advanced Shipping Notification ("ASN")), about consolidated packages directed to that authorized outlet. The ASN may be transmitted via a network such as the Internet, facsimile, wired or wireless telephone systems, etc. The ASN includes sufficient information about the shipment to streamline the distribution process at the authorized outlet. For example, it may include the tracking identifier and the sub-package identifiers as well as customer names or IDs (i.e., customer identifiers) so that the package may be tracked and customers may be pre-alerted of the shipment of their order. It may also contain an electronic control sheet or a link to obtain the control sheet.

The authorized outlet will generally utilize the control sheet as a control log and any information needed on the control log (a control log can be a manual or electronic log) is recorded by authorized outlet personnel. The control log generally includes information such as: carrier; tracking identifier; date received; weight; number of customers that have bundles in the package; each customer's name or identifier that has a bundle in the consolidated package, and; the control numbers for each customer's sub-package and/or bundle. A bundle is one or more sub-packages within a consolidated package that is intended for one particular customer. The authorized outlet may use the control sheet that is associated with the consolidated package as its control log to avoid duplication of information or it may create a new one, if necessary. The authorized outlet may also input any necessary information to the authorized outlet's billing or point-of-sale system, either manually or electronically. Most of this data may be transmitted electronically (by scanning or other means) to reduce the amount of manual tasks. If the authorized outlet is an unattended facility, sub-packages for each customer will be placed securely into a secured storage area, such as a locker system.

A customer should provide some form of personal identification when retrieving a sub-package from an authorized outlet. This may include, for example, a PIN for accessing an unattended facility. Another authorized person may be allowed to pick up orders after also providing a valid personal identification.

When a sub-package is picked up, the authorized outlet will record on the control log the date/time the sub-package was picked up and shall obtain the customer's acknowledgment of receipt, either manually or electronically. In some cases, the customer may need to bring a return item before retrieving a sub-package (for example, if the sub-package contains a part that is being replaced under a warranty or re-call program).

Generally, customers are encouraged to retrieve sub-packages from the authorized outlet as soon as possible, thus reducing the cost of holding inventory. Two separate time deadline are applied to encourage this behavior. A storage fee may be charged to the account or the sub-package returned to the DC.

A consolidated package may also include a return tracking identifier to be used by the authorized outlet for the return of unclaimed sub-packages contained within the consolidated package, or for the return of any items brought in by the customer. The return tracking identifier may come with the consolidated package shipping document from the DC or may be created by the authorized outlet.

When sub-packages in the consolidated packages are picked up (claimed) or returned to stock (unclaimed by the time return deadline is reached), then the authorized outlet will close out each sub-package. If the sub-package has been claimed, the signature or proof of delivery and pick up date/time from the control log will be loaded into the authorized outlet's information system (if not already there). For unclaimed sub-packages, the return tracking number and return date/time will be loaded into the information system (if not already there). The unclaimed sub-packages will be placed into a consolidated return package. Each unclaimed sub-package is still associated with a sub-package identifier. This identifier is linked to the (master) return tracking identifier of the consolidated return package. Therefore, each sub-package being returned can be tracked and controlled as if it was an individual order. Return items are separately packaged by the authorized outlet for return shipment. The authorized outlet then returns the consolidated return package to the DC via a shipping service.

Consolidated return packages are received at a DC and are segregated depending upon whether the package contains sub-packages or return items. By entering (scanning) the return tracking label and/or the sub-packages' identifier, the DC closes out the unclaimed order and the unclaimed items can be placed back into the inventory of the DC, returned to a vendor, or further dispositioned. Return items are returned to a manufacturer, repaired, destroyed, etc.

Therefore, the present invention provides for a system and method of consolidating, shipping and distributing items comprising multiple orders to multiple customers. The orders are filled and packaged in fewer containers than there are orders. However, each order is individually packaged, controlled, tracked and received as an individual order. The consolidated containers are received at an authorized outlet and the individual orders are distributed to the customers.

The present invention reduces costs incurred in warehouse processing and supplies, such as by reducing pick time, reducing material handling, and reducing packaging supplies. It will also reduce transportation costs by both reducing the number of separate packages shipped as well as utilizing commercial delivery rates versus residential rates. The present invention also provides systems and methods for returning orders that are not picked up at the authorized outlet to a central location. Furthermore, all of the concepts allow tracking of what orders have been delivered or returned, who picked up the orders and when, all while reducing the frequency of delivery failures caused by the delivery service failing to meet an intended recipient.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4 is an illustrative control device used in an embodiment of the invention.

FIG. 5 is an illustrative control log used in an embodiment of the invention.

FIG. 6 is an illustrative packing slip used in an embodiment of the invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
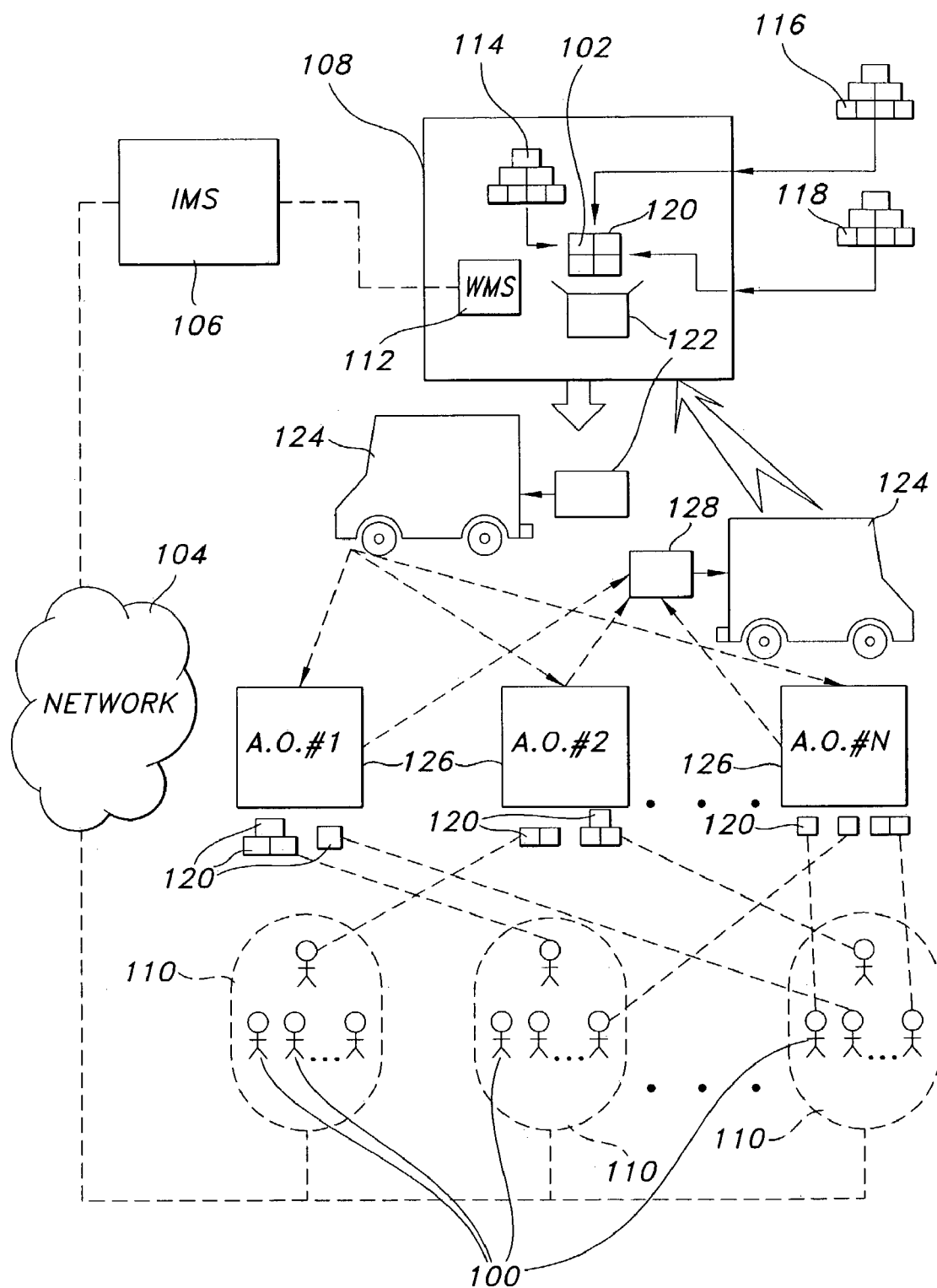
FIG. 1 is an illustrative overview of a system in an embodiment of the invention.

FIG. 1 is an overview illustration of one embodiment of the invention. Customers 100 place orders for one or more items 102 with an inventory management service ("IMS") 106. Such orders may be placed via a network 104. The order may be placed through one or more various means such as, for example, electronic data interface, the Internet, wired or wireless telephone systems, facsimiles, etc. The IMS 106 is associated with one or more warehouses or centralized distribution centers ("DCs") 108. A customer 100 is associated with an account 110. Each account 110 may have one or more customers 100. For example, Account A may be comprised of Customer 1 through Customer 20, Account B may be comprised of Customer 1 and Customer 2, whereas Account C may only be comprised of Customer 1, etc. An account 110 may have a prior relationship with the IMS 106 or such relationship may be established at the time the order is placed. An account 110 may be a business organization such as, for example, an office equipment repair and maintenance company that has employees (technicians) that order repair parts from the IMS 106. In this example, the technicians will be considered the customers 100. The account 110 and the IMS 106 will have an agreement whereby the IMS 106 provides the account's technicians with ordered parts for a fee.

Orders are comprised of one or more items 102 that are desired or needed by a customer 100. Orders are received from customers 100 by the IMS 106 and are passed from the IMS 106 to an information system such as, for example, a warehouse management system 112 where they are collected until they are released for fulfillment based upon certain criteria. The ordered items 102 may be picked from inventory that is on-hand 114 in the DC 108 or in other associated DCs 108, inventory from a third-party 116 such as another inventory management service or warehouse, or inventory from a vendor or manufacturer 118. A packing slip (not shown in FIG. 1, reference FIG. 6) is created for each order placed by a customer 100. The packing slip 600 may be created manually or generated by the warehouse management system 112. The packing slip 600 indicates the items 102 that comprise an order and that are to be packaged to together to form a sub-package 120. The packing slip 600 also indicates the sub-package identifier 606 and the tracking identifier 610 of the consolidated package, thereby showing the link between the sub-package identifier 606 and the tracking identifier 610 of the consolidated package 122. The ordered items 102 are sorted into sub-packages 120, where each sub-package 120 contains one or more items 102 ordered by a customer 100. Each sub-package 120 has a unique sub-package identifier. The sub-package identifier may be one or more of human-readable indicia such as, for example, an alphanumeric code (such as an order number), a name, a symbol, etc., or it may be machine-readable indicia such as, for example, a bar code, a radio frequency identification ("RFID") tag, etc. The sub-package identifier may be a combination of a both, human-readable indicia and machine-readable indicia.

The sub-packages 120 are then packaged into one or more consolidated packages 122. The packing slip 600 for each sub-package 120 is associated with its respective sub-package 120. The packing slip 600 indicates each item 602 that comprises that sub-package 122, the tracking identifier 610 of the consolidated package 122 that the sub-package 120 will be shipped in, the sub-package identifier 606, the authorized outlet 612 where the sub-package will be shipped and a customer identifier 604 of the customer that ordered the items contained with in the sub-package 120. The customer identifier may be the customer's name, an employee code, ID code, PIN, etc. In one embodiment, the sub-package container may be comprised in part or entirely of a transparent material such that the packing slip 600 can be inserted into the sub-package container and be visible without opening the container. In other embodiments the packing slip 600 may be externally affixed to the sub-package container. The packing slip 600 facilitates a quick audit of the contents of the sub-package 120 as well as identifying the customer and the authorized outlet to which the sub-package 120 is to be shipped.

Each consolidated package 122 has an associated control device (not shown in FIG. 1, reference FIGS. 2 and 4), which associates each sub-package 120 contained within the consolidated package 122 with a customer 100. This is accomplished by showing the link between the customer identifier and the sub-package identifiers of the sub-packages 120 ordered by that customer. The control device at least identifies the customer 100 and indicates the sub-packages 120 that are associated with that customer 100. For instance, the control device may simply be a sheet inserted into the consolidated package 122 that has the customer identifiers (e.g. customers' names) and lists sub-package identifiers for the sub-packages 120 that are intended for each identified customer 100. The control device may also be an electronic transmission such as, for example, an email that provides information linking the sub-packages 120 in a consolidated shipment 122 with the intended recipients. FIG. 4 is an illustrative example of a control sheet that may be used in an embodiment of the invention. The control sheet 400 may include a location for a customer 100 or a customer's designee to acknowledge their receipt of the sub-package 120.

Figure 2:
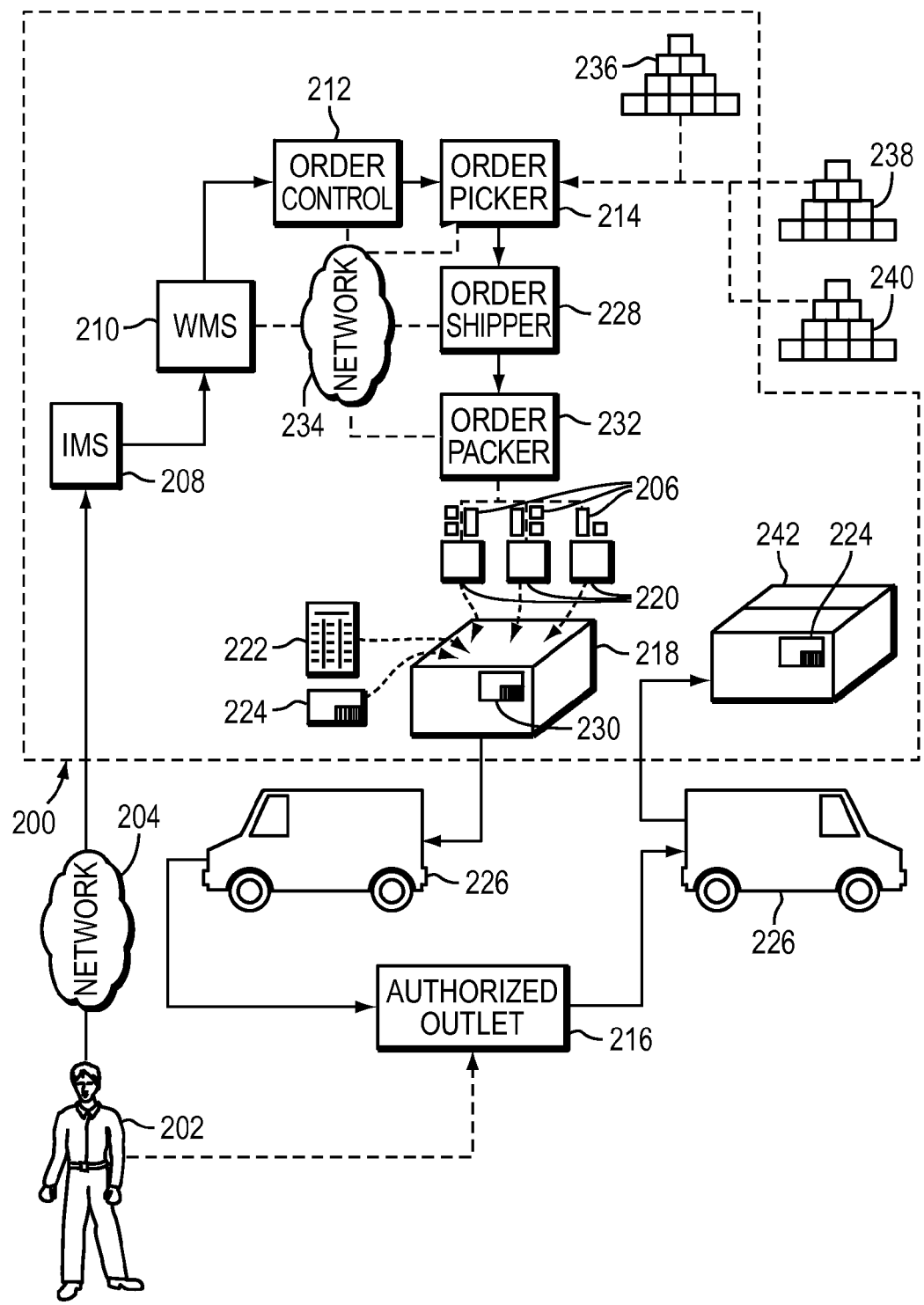
FIG. 2 is an illustrative overview of the systems and operation of a distribution center in an embodiment of the invention.
Figure 3:
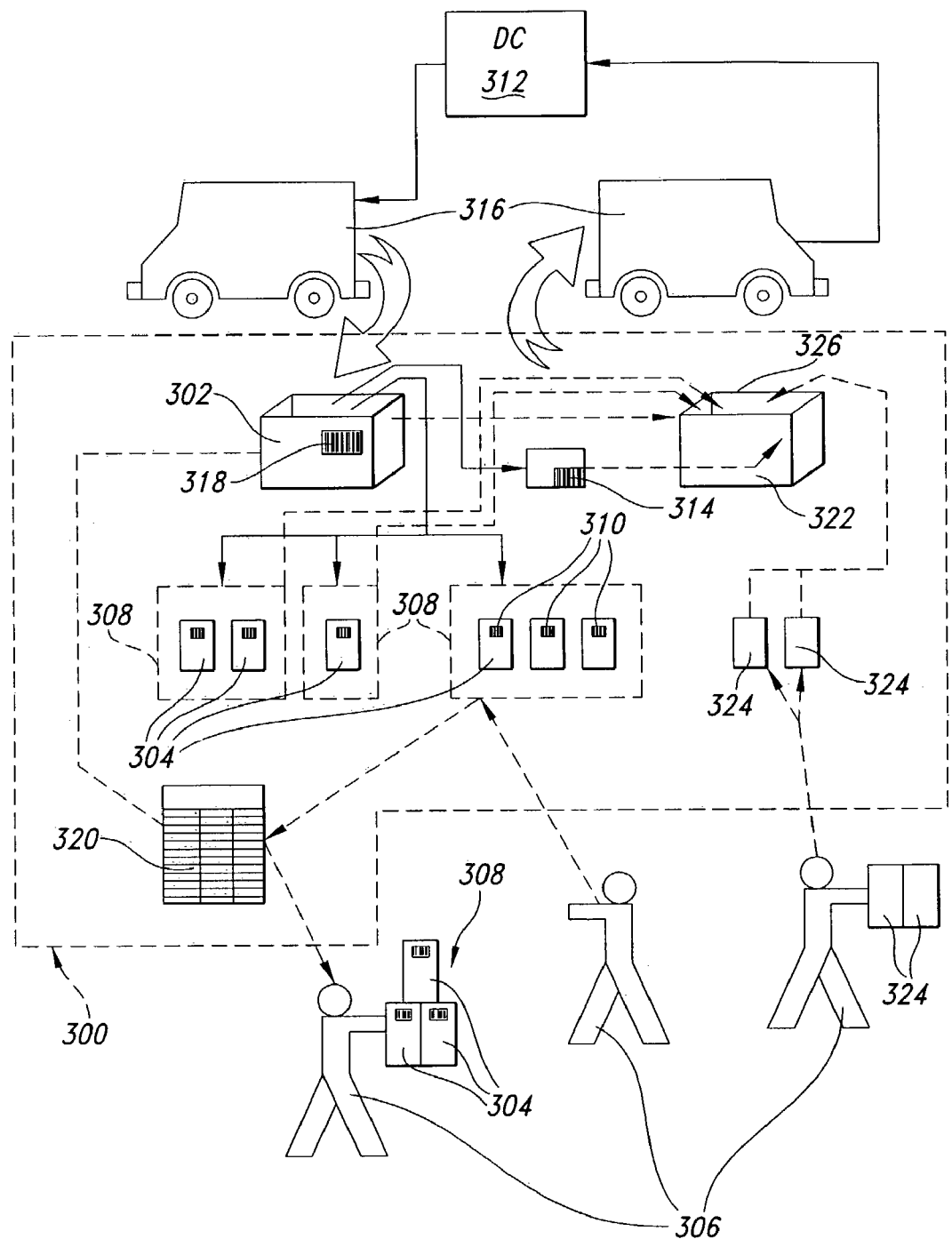
FIG. 3 is an illustrative overview of the systems and operations of an authorized outlet in an embodiment of the invention.

The consolidated package 122 will have a unique tracking identifier (not shown in FIG. 1, reference FIGS. 2 and 3). The tracking identifier may be one or more of a human-readable indicia such as, for example, an alphanumeric code, a name, a symbol, etc., or it may be a machine-readable indicia such as, for example, a bar code, a radio frequency identification ("RFID") tag, etc. The tracking identifier may be a combination of a both, human-readable indicia and machine-readable indicia. The sub-package identifier for each sub-package 120 contained within a consolidated package 122 is linked to the tracking identifier. This linking may occur automatically when the packing slip 600 is generated by the warehouse management system 112 and such information is recorded in an electronic database, through the use of devices that scan or read the tracking identifier and the sub-package identifiers and record the information into an electronic database, or it may occur manually through the use of paper and a writing instrument whereby the association between sub-package identifiers and the tracking identifier is recorded. The linking of the sub-package identifiers to the tracking number allows the tracking of sub-packages 120 as if they are individually-shipped packages. This tracking information may be available for access such as, for example, on the inventory management service's 106 or a shipping service's 124 website or dial-up system.

In one embodiment, the link between each sub-package identifier that comprise a consolidated package 122 and the tracking identifier of the consolidated package 122 is established at the time the packing slip 600 is created by the warehouse management system 112. As a quality control check, the sub-package identifier as indicated on the packing slip 600 of each sub-package 120 that comprise the consolidated package 122 will be scanned and then the tracking identifier of the consolidated package 122 scanned. If the sub-package identifier and the tracking identifier of the consolidated package 122 are not linked by the warehouse management system 112, then a warning is provided. This check helps ensure that sub-packages 120 are packed into the correct consolidated package 122.

Consolidated packages 122 are shipped from the DC 108 and via a commercial shipping service 124 to one or more authorized outlets 126. An authorized outlet 126 is a location where orders are made available and distributed to the customer 100 that placed the order, or that customer's designee. An authorized outlet 126 may be an attended or unattended facility. In many instances the authorized outlet 126 may be a retail facility such as, for example, Mail Boxes Etc., Office Depot, Office Max, Kinko's, etc.

The authorized outlet 126 receives the consolidated package 122, unpacks it and prepares a control log (not shown in FIG. 1, reference FIGS. 3, 4 and 5), which includes customer identifiers and the sub-packages 120, as identified by their sub-package identifiers, that are associated with each customer identifier. In some instances, the authorized outlet may utilize the control device (reference FIG. 4) provided with the consolidated package 122 as the control log thereby avoiding duplicative efforts of recording information. The sub-packages 120 are made available to the customers 100 at the authorized outlet 126. The customer 100, or a designee of the customer 100, will retrieve the sub-package 120 from the authorized outlet 126. When retrieving a sub-package 120, a customer 100 may have to provide some form of identification and acknowledge receipt of the sub-package 120, such as by showing an ID and signing the control log, respectively, entering a PIN or a passcode, scanning or reading an employee ID or badge, etc. in order to be allowed access to the sub-package 120. Customers 100 may be associated with a specific authorized outlet 126 based upon the location of the customer 100, the location of the authorized outlet 126, as requested or specified by the customer 100, or by agreement with the account 110.

A sub-package 120 that is not retrieved from the authorized outlet 126 within a certain time period may result in an inventory fee assessed against the customer 100, or the account 110, by the authorized outlet 126. In other embodiments, un-retrieved sub-packages 120 are returned to the DC 108 if not retrieved within a certain period of time. The consolidated package 122 shipped from an inventory management service 106 to an authorized outlet 126 may also be associated with an authorization for return shipping ("ARS"), (not shown in FIG. 1, reference FIGS. 2 and 3). ARS is when an entity shipping a package, in this case the DC 108, provides a means of returning the items shipped in the package through a commercial shipping service, with the cost of the return shipping borne by the entity shipping the package. An ARS allows the return of sub-packages 120 that have not been retrieved to the DC 108 without the authorized outlet 126 incurring shipping charges. Furthermore, in other embodiments, items that are returned by a customer 100 to an authorized outlet 126 when retrieving a sub-package 120 may be shipped to a DC 108 (reference FIG. 3). In some instances, a customer 100 may be required to exchange an item before retrieving an ordered item 102. For example, items returned under a replacement warranty may be brought to an authorized outlet 126 by a customer 100 and exchanged for a new item 102. The authorized outlet 126 will then return the warranty item to the DC 108 where it will be further processed. The warranty item may be returned to the DC 108 in a shipping container that contains both, returned sub-packages 120 and return items or in separate shipping containers segregated by unclaimed sub-packages and return items (a "return package") 128. The return package 128 is associated with the ARS and a shipping service 124 transports the return package 128 from the authorized outlet 126 to a DC 108.

FIG. 2 provides detail about the operations of a DC 200 in an embodiment of the invention. A customer 202 places an order via a network 204 for one or more items 206 with an IMS 208. The IMS 208 passes the order on to an information system such as, for example, a warehouse management system 210 that is associated with one or more DCs 200. The warehouse management system 210 maybe associated with the IMS 208 or it may be independently operated. Orders for items 206 are collected within the warehouse management system 210 until certain criteria are met, at which time the orders are released for fulfillment.

An order control function 212 at the DC 200 is responsible for the flow of information about all orders. Order control 212 will provide consolidation of various orders from various customers 202 and then give consolidated order picking instruction (for example, consolidated order pick slips), to an order picker function 214. Pick slips are not necessarily paper and may be information downloaded and displayed on a hand-held electronic device or displayed on screens throughout the DC 200. Order picking may be accomplished manually through the use of warehouse personnel or automated warehousing techniques may be employed. The order picker function 214 picks orders by utilizing efficient warehouse picking techniques such as, for example, wave picking methods. Generally, wave picking is the picking of specific items 206 for multiple orders within an item category or warehouse location. For example, one "wave picker" may be given specific number of different items 206 to pick for a number of different orders. Another wave picker may be given other items 206 to pick for the same orders. Items may be sorted into their respective orders as they are picked or these picked items would be brought to a shipment staging area to be sorted and assembled by order for packing and shipping.

Wave picking is a commonly known warehouse picking method, where orders are grouped into "waves" based on certain criteria. This grouping can save picking time by reducing travel time and the number of locations visited during warehouse picking to fill the orders. Two examples of wave picking that may be utilized in embodiments of the present invention are "scheduled pick time wave picking" and "consolidation wave picking," although other forms of wave picking or warehouse picking techniques may be utilized.

Scheduled pick time wave picking involves the process of immediately upon receiving an order, order control 212 will not prepare a pick slip and give it to the order picker 214 immediately, but will accumulate orders until a scheduled pick time. The pick time is scheduled accordingly so that orders can be shipped out on schedule as requested by each account (a company or organization that is associated with a group of customers). The accumulation period and pick up time can be scheduled within one day, two days, one week, or longer, depending on the response time requested. For example, Authorized Outlet #1 may have scheduled pick time at 3:00 p.m. every day for "next day" shipments for all accounts, and 2:00 p.m. each Monday and Thursday for "ground shipments" for Account A, and 1:00 p.m. each Wednesday for ground shipments for Account B. This scheduled pick time will allow as many orders as possible to be included into a consolidated wave pick with less travel time, fewer number of locations visited, and less package handling within the DC 200.

Consolidation wave picking involves the order control function 212 creating a "consolidated orders pick slip" prior to each pick session. Orders received at the time of the pick session are sorted by account, by each authorized outlet 216 and then by customers' names or customer identifiers. That is, all of these orders are consolidated and will comprise a part of a consolidated package 218 that goes to an authorized outlet 216. Orders for the same customer 202 to an authorized outlet 216 may be bundled together. The information system 210 used may provide an optimized pick route through the DC 208 for the consolidated package 218. Depending on the optimal pick route, the order picker 214 may pick orders one at a time or multiple orders simultaneously.

Items 206 may be picked from inventory that is on-hand 236 in the DC 200 or an associated DC, or it may be obtained from a third-party's inventory 238 or a manufacturer's inventory 240.

An order shipper function 228 creates a packing slip/manifest 600 for each order (sub-package). The packing slip 600 may be created simultaneously with the pick slips. Each packing slip 600 includes a unique sub-package identifier 606 such as, for example, an order number. Each unique sub-package identifier 606 within a consolidated package 218 is linked to a shipping tracking identifier 230 of a consolidated package 218. That is, all sub-packages 220 within a consolidated package 218 will have unique sub-package identifiers that are linked to the same tracking identifier 230. This linking occurs as part of the warehouse management system when the packing slip 600 and pick slips are created. The packing slip 600 will at least indicate the sub-package identifier 606, the tracking identifier 230, 610 of the consolidated package 218 in which that sub-package 220 is to be shipped, the items 602 that comprise the sub-package (as such items may be identified by item numbers, codes, descriptions, etc.), the authorized outlet 612, and the customer identifier 604 of the customer that ordered or is to receive that sub-package 220. As previously described, the packing slip or manifest 600 is included within its sub-package such that it may be viewed without opening the sub-package or it is affixed externally to the sub-package. Therefore, each sub-package 220 may be tracked and controlled as if it were an individually shipped package.

Generally, all sub-packages 220 designated for one account at one particular specific authorized outlet 216 will be placed into one master container. However, depending on the dimensions, weight limitations, and number of accounts serviced from that authorized outlet 216, an authorized outlet 216 may receive more than one consolidated package 218. The packing of the shipping containers with the sub-packages 220 is performed by the order packer function 232. The packing slip 600 will indicate the tracking identifier 230, 610 of the shipping container in which each sub-package 220 is to be packed. As previously described, the warehouse management system 210 may include a system to scan the sub-package identifiers 606 and the tracking identifier 230 to ensure that the sub-packages 220 are packed into the appropriate shipping containers (as identified by the tracking identifier 230).

The order packer function 232 attaches a shipping label with a tracking identifier 230 to the consolidated package (master container) 218. Along with the master container 218, a control device 222 is included either manually and/or electronically, (for example, it could be included in the container in a tangible form or it could be electronically mailed to the designated authorized outlet 216). The control device 222 is comprised of at least the following information: authorized outlet 218 ID, carrier 226, tracking identifier 230, number of customers, sub-package IDs (order number) and names of customers or customer identifiers. The consolidated package 218 may also have a return tracking label 224 (ARS label) to be used (if necessary) for the consolidated return of sub-packages 220 not retrieved by customers 202. In some instances, the ARS label 224 may be used to return items left at an authorized outlet 216 by customers 202. The ARS label 224 may be contained in the consolidated package 218 or it may be transmitted as an electronic transmission to an authorized outlet 216. In one embodiment, an intelligent ARS is used whereby the return tracking label 224 may already be linked in an electronic database to the tracking identifier 230 of the consolidated package 218, with the tracking identifier 230 linked to the sub-package identifiers. Such an intelligent ARS label is described in U.S. patent application Ser. No. 10/177,508, "Intelligent Authorized Return Systems and Methods," filed Jun. 20, 2002, naming Smith as inventor, commonly assigned to the owner of this invention, attached hereto as APPENDIX A and fully incorporated herein and made a part hereof. The consolidated package 218 is shipped to an authorized outlet 216 via a shipping service 226.

The order control 212, order picker 214, order shipper 228 and order packer 232 functions may exchange information between themselves and the warehouse management system 210 via a network 234; or the order control 212, order picker 214, order shipper 228 and order packer 232 functions may be controlled by the warehouse management system 210 via the network 234.

Consolidated Packages

Referencing both FIGS. 2 and 3, the following describes a preferred embodiment of the invention. FIG. 2 provides detail of an embodiment of an authorized outlet 216, 300 where consolidated packages 218, 302 may contain more than one sub-package 220, 304, each of which are held for pickup at an authorized outlet 216, 300 by one or more customers 202, 306. The term "bundle" 308 refers to one or more sub-packages 220, 304 contained in a particular consolidated package 218, 302 that are to be picked up by the same customer 202, 306. For example, a consolidated package 218, 302 that contains six sub-packages 220, 304, one of which is to be picked up by Customer A, two of which are to be picked up by Customer B, and three of which are to be picked up by Customer C, contains three bundles 308. The one sub-package 220, 304 for Customer A comprises one bundle 308, the two sub-packages 220, 304 for Customer B comprises another bundle 308 and the three sub-packages 220, 304 intended for Customer C comprises yet another bundle 308.

As previously described, each consolidated package 218, 302 is associated with a control device 222, which links the customer's identifier with that customer's sub-packages 220, 304 within the consolidated package 218, 302. The control device 222 may be created automatically by the warehouse management system 210 or it may be created manually by DC 200, 312 personnel. Each sub-package 220, 304 in a consolidated package 218, 302 will have a sub-package identifier 310.

Consolidated packages 218, 302 shipped from a DC 200, 312 may contain return shipping authorization such as, for example, return shipping labels (an "Authorized Return Service (ARS) label") 224, 314, to be used by the authorized outlet 216, 300 for the return of unclaimed sub-packages (if any) 220, 304 contained within such consolidated package 218, 302. As previously described, in one embodiment a provided ARS label 224, 314 may be an intelligent ARS label that is linked to the tracking identifier 230 of the consolidated package 218, 302 and the tracking identifier 230 is linked to the sub-package identifiers 310 of the sub-packages 220, 304 contained within that consolidated package 218, 302. In other embodiments that provided ARS label 224, 314 does not have the "intelligence" capabilities, or the return shipping label 224, 314 may not be provided in the consolidated package 218, 302 and may be created at the authorized outlet 216 when unclaimed sub-packages 220, 304 and other items are returned.

Authorized outlets 216, 300 may receive consolidated packages 218, 302 or individual packages for distribution to customers 202, 306 from DCs 200, 312 or directly from vendors, suppliers or manufacturers. When packages are received directly from vendors, suppliers or manufacturers, an invoice number, order number or purchase order number may be substituted for a sub-package identifier 310.

Deliveries to the authorized outlets 216, 300 are generally made using the normal delivery schedule for the shipping service 226, 316 in that geographic area unless the customer 202, 306 or the authorized outlet 216, 300 coordinate special arrangements. Consolidated package 218, 302 shipments may be tracked by the IMS 208, the authorized outlet 216, 300 and the customer 202, 306 via the tracking identifier 230 and access to the shipping service's 226, 316 tracking system.

Receipt by an Attended Authorized Outlet

Personnel at an attended authorized outlet 300 will accept the delivery of consolidated packages 302 or individual packages for customers 306. "Attended" in this instance means there are personnel at the authorized outlet 300 to receive consolidated packages 302 or other delivered packages, unpack, control access and distribute sub-packages 304 on at least a part-time basis.

Promptly following receipt of a consolidated package 302, authorized outlet 300 personnel will (i) open the shipping container; (ii) record the following information (if not already provided by a control device 222): (A) carrier 316, (B) tracking identifier 318, (C) date received, (D) weight, (E) number of customers that have sub-packages 304 in the package 302; and (F) the customer identifier for each customer 306 that has a bundle 308 in the consolidated package 302; this information is recorded on a permanent log 320 that the authorized outlet 300 maintains for sub-packages 304 (the "control log"); and, (iii) make the sub-packages 304 available for pick-up by the customers 306. Information may be recorded electronically or manually into the control log 320. In some instances, the control device 222 may be utilized as the control log 320, therefore facilitating the receiving process.

In the event the associated control sheet 222 or other information, such as an invoice contained with or in the consolidated package 302, indicates that one or more sub-packages 304 are supposed to be in the consolidated package 302, but are not (an "omitted sub-package"), the authorized outlet 300 is to promptly notify the IMS 208. The authorized outlet 300 retains the original consolidated package container 322 and packaging materials until the customers 306 have picked up all the sub-packages 304 that were shipped in that consolidated package 302. If sub-packages 304 remain unclaimed for a time period in excess of a predetermined time period, the unclaimed sub-packages 304 are returned to a DC 312 in the original consolidated package container 322. Furthermore, items exchanged by customers 306 when retrieving sub-packages 304 will be returned to a DC 312 in a consolidated package container 322.

When a sub-package 304 is picked up, authorized outlet personnel or the person retrieving the sub-package 304 will record on the control log 320 the date the sub-package 304 was picked up and shall obtain the signature or some other acknowledgment of receipt from the person retrieving the sub-package 304 on the control log 320. In one embodiment, the acknowledgment is recorded in the authorized outlet's 300 point-of-sale ("POS") system, to indicate the delivery is complete. If the sub-package 304 is unclaimed and returned to a DC 312, the authorized outlet 300 may enter the return tracking identifier 314 into the POS system to indicate the return of the unclaimed sub-package 312.

Unattended Authorized Outlet

If the authorized outlet 300 is an unattended facility, then the sub-packages 304 are placed into a secure area of an unattended facility such that they may be retrieved by a customer 306 having access to the secure area. The IMS 208, a courier, or a third-party under the employ of the IMS 208 places the sub-packages 304 into the secure areas of the unattended facilities. Such an unattended system that may be utilized as an authorized outlet 300 is described in U.S. non-provisional patent application Ser. No. 10/285,115, "Systems and Methods of Inventory Management Utilizing Unattended Facilities," filed Oct. 31, 2002, naming Knowles, et al. as inventors, commonly assigned to the owner of this patent application, is attached hereto as APPENDIX B, and is fully incorporated herein and made a part hereof. The customer's 306 gaining access to the secure area of the unattended facility by use of a PIN or some other form of an access code provides acknowledgment of the customer's 306 receipt of the sub-package 304 contained within that secure area. As more fully described in the Ser. No. 10/285,115 patent application, items may be retrieved as well as returned to an unattended facility.

Problem Receipts

1. No Designated Individual for Pick Up

In a preferred embodiment, if any consolidated package 302 or sub-package 304 is not associated with a control device 222, packing slip 600, or invoice identifying the sub-package identifiers 310 and/or the customer identifiers, the authorized outlet 300 that received the consolidated package 302 will notify the account. Notification may occur manually or automatically such as through the authorized outlet's 300 inventory management system and via a network. If a representative of the account fails to pick up the unidentified sub-package 304 by the end of a predetermined time period (e.g., five days), then the authorized outlet 300 will process any unidentified order as an unclaimed package.

2. Refused Packages

If an account's authorized employee or agent (i.e., a customer 306) fails to pick up or refuses to accept a bundle 308 or sub-package 304, the authorized outlet 300 will notify the account. Notification may occur manually or automatically such as through the authorized outlet's 300 inventory management system and via a network. If the account (or the account's designee) fails to pick up the unclaimed or refused bundle 308 or sub-package 304 by the end of a predetermined time period, then the authorized outlet 300 will return the unclaimed or refused sub-package 304 or bundle 308 to the DC 312 utilizing the included ARS label 314; return the sub-package 304 or bundle 308 utilizing an intelligent ARS label; or further process such return package as directed by the IMS 208.

3. Customer Pick-Up

The customer 306 will normally be required to show proof of identity and to acknowledge receipt of each sub-package 304 that comprise that customer's 306 bundle 308. The customer's 306 acknowledgment will provide proof for the IMS 208 and the authorized outlet 300 that the sub-package 304 has been delivered. Acknowledgment may be shown in a number of ways, such as, for instance, signing the control log 320 when a sub-package 304 is retrieved. Also, acknowledgment may be shown by the authorized outlet 300 processing of an account's work order by entering it into an authorized outlet's 300 POS system to record delivery. If the authorized outlet 300 is unattended, acknowledgment of receipt is assumed by the customer's use of their passcode to access the unattended facility and the removal of the sub-package 304.

Authorized Outlet Storage

Any bundle 308 that has not been picked up by a predetermined deadline (the "first deadline"), may incur a storage charge per bundle 308 for each business day after the First Deadline that the bundle 308 remains at the authorized outlet 300 (including the business day on which the bundle 308 is picked up or is returned to the DC 312). The per day charge may be recorded in the authorized outlet's 300 inventory management system (i.e. POS system), or manually recorded. It may be noted on the control log 320. The authorized outlet 300 will notify the IMS 208 of any assessed fees and the IMS 208 will invoice the account for the fees. The authorized outlet's 300 inventory management system may be connected to the IMS's 208 information system through a network such as, for example, the Internet. In this way, the IMS 208 may be able to automatically assess fees to the account.

Unclaimed Consolidated Package or Sub-Package

In a preferred embodiment, sub-packages 304 received at an authorized outlet 312 from a DC 312 that have not been picked up by the close of business after a second predetermined time period (the "Second Deadline") following receipt of the consolidated package 302 which contained such sub-packages 304 will be returned in the original consolidated package box and then be shipped to the DC 312, utilizing the associated ARS label 314. Preferably, a sub-package 304 may not be redirected by the account to be shipped by the authorized outlet 300 to a location other than a DC 312 without an account representative first signing for receipt of the sub-package 304.

Systems or personnel of the authorized outlet 300 will generally notify the account (systems or personnel) if the sub-packages 304 at the authorized outlet 300 were not received from a DC 312 (for instance, were received directly from a vendor or manufacturer (i.e., "drop shipped"), and have not been picked up by the First Deadline following receipt of the consolidated package 302 that contained such sub-package 304. If the account or the account's representative fails to pick up the sub-package 304 by the end of the Second Deadline after such notification, the authorized outlet 300 will generally return such sub-packages 304 in the original consolidated package container 322 to the DC 312, utilizing a generic ARS label to be provided by the IMS 208; return the sub-packages 304 to the DC 312 utilizing an included ARS label 314; return the sub-packages 304 utilizing an intelligent ARS label; or further process such return package as directed by the IMS 208.

Returns to the Centralized Distribution Center (DC)—Authorized Returns Service (ARS)

If the sub-package 304 was received by the authorized outlet 300 from a DC 312 and there is an ARS label 314 associated with the original consolidated package 302, the unclaimed sub-package 304 will be repacked in the same or a similar container 322 as the sub-package 304 was received in and shipped via a shipping service 316 to, the location designated on the ARS label 314 (generally, a DC 312), although if the return ARS is an intelligent ARS, then a "rules engine" associated with the intelligent ARS (as more fully described in the Ser. No. 10/177,508 application) will determine the location to ship the return package 322. The authorized outlet 300 will generally provide the packaging material to protect the returned sub-package 304 during transportation.

Generally, return transactions will be recorded in the authorized outlets' 300 POS systems and the IMS 208 will be invoiced for any return handling charges recorded by the authorized outlet 300. Such information may be passed through a network from the authorized outlets' 300 POS system to the IMS's 208 information system. The account will be invoiced by the IMS 208 for the return fees associated with the authorized outlet 300 as well as any fees assessed by the IMS 208 for handling, restocking, etc. The account will be invoiced separately by the shipping service 316 for the ARS, intelligent ARS, or other transportation costs associated with the return package 322. In other embodiments, the account may receive only one invoice for IMS and shipping service 316 fees.

Now described more in-depth, a consolidated package 302 may also include a return tracking identifier 314 (an ARS label) to be used by the authorized outlet 300 for the return of unclaimed sub-packages 304 contained within the consolidated package 302, or for the return of any items 324 brought in by the customer 306. The return tracking identifier 314 may come with the consolidated package 302 shipping documents from the DC 312 in the form of a label or electronic transmission (i.e., email), or it may be created by the authorized outlet 300. The return tracking identifier 314 may be an intelligent return tracking identifier as disclosed in the Ser. No. 10/177,508 patent application, incorporated herein. An intelligent return tracking identifier may be linked with the tracking identifier 318 of the consolidated package 302. Therefore, any unclaimed sub-packages 304 will already be linked with the intelligent return racking identifier. Intelligent ARS also provides the capability to have a return package 322 shipped to various locations dependent upon business rules incorporated into the intelligent ARS rules engine.

When sub-packages 304 in the consolidated packages 302 are picked up (claimed) or returned to stock (unclaimed by the time return deadline is reached), then the authorized outlet 300 will close out each sub-package 304. If the sub-package 304 has been claimed, the signature or proof of delivery and pick up date/time from the control log 320 will be loaded into the authorized outlet's 300 information system (if not already there), or otherwise provided to the IMS 208. For unclaimed sub-packages 304, the return tracking identifier 314 and return date/time will be loaded into the information system (if not already there), or otherwise provided to the IMS 208. The unclaimed sub-packages 304 will be placed into a consolidated return package 242, 326. Each unclaimed sub-package 304 is still associated with a sub-package identifier 310. This sub-package identifier 310 is linked to the (master) return tracking identifier 314 of the consolidated return package 242, 326 either automatically if the return tracking identifier 314 is an intelligent return tracking identifier, or it can be scanned and linked in an electronic database, or it may be linked manually by recording the return tracking identifier 314 and the sub-package identifiers 310 of the sub-packages 304 being returned. Therefore, each sub-package 304 being returned can be tracked and controlled as if it was an individual order. The authorized outlet 300 then returns the consolidated return package 242, 326 to a DC 200, 312 or other location via a shipping service 226, 316. Items 324 that have been returned to an authorized outlet 300 under an exchange or replacement program are packaged and shipped separately from the authorized outlet 300 to a location specified by the IMS 208 (either directly or through the use of an intelligent ARS label). In some instances, control systems or procedures at the authorized outlet 300 may require that an item 324 be returned to the authorized outlet 300 before the person can retrieve a bundle 308. The IMS 208 will generally provide an ARS label for shipping the return items; however, the authorized outlet 300 will be reimbursed by the IMS 208 for any shipping costs that may be incurred by the authorized outlet 300.

Consolidated return packages 242, 326 received at a DC 200, 312, DC 200, 312 are segregated depending on whether they contain unclaimed sub-packages 304 or return items 324. By entering (scanning) the return tracking identifier 314 and/or the sub-packages' identifier 310, the DC 200, 312 closes out the unclaimed order and the unclaimed items can be placed back into the inventory of the DC 200, 312, returned to a vendor, or further dispositioned. Return items 324 are returned to a manufacturer, repaired, destroyed, etc.

Claims for Loss or Damage

1. Participating Center Responsibility

When an authorized outlet 300 accepts a consolidated package 302 from a shipping service 316, the authorized outlet 300 generally assumes responsibility for the consolidated package 302 and the sub-packages 304 contained therein (but generally not for omitted sub-packages), until such sub-packages 304 are either (i) picked up by a customer 306 and an acknowledgment of receipt is recorded on the control log 320, or (ii) such sub-packages 304 are returned by the authorized outlet 304 with an associated ARS label 314 and the origin of the returned package 304 is the authorized outlet 300.

2. Discrepancies Within a Sub-Package

Upon receipt of a sub-package 304, if a customer 306 believes that there is a shortage within such sub-package 304; or if the control device 222, packing slip 600 or invoice does not match the actual contents of the sub-package 304, the customer 306 will note the discrepancy on the control log 320 along with the customer's acknowledgment of receipt of the sub-package 304. The authorized outlet 300 will follow normal routine for the filing and retention of the control log 320. The customer 306 is responsible to report a loss, shortage, discrepancy, or damages to the account's representative or to the IMS 208.

3. Damage Discovered at Authorized Outlet

The authorized outlet 300 will immediately notify the IMS 208 when damage to the contents of a sub-package 304 is discovered and provide the shipping tracking identifier 318 and describe the damage. The authorized outlet 300 will also notify the customer 306 expecting to pick up the sub-package 304. Such notification may be automated. The authorized outlet 300 will retain the original package, the packaging material and the damaged contents of any damaged package until receiving disposition instructions from the IMS 208.

Wireless Communication Devices

Another embodiment of the present invention involves the consolidated shipment and ensuing distribution of wireless communication devices through authorized outlets. In this embodiment, wireless communication devices are substituted for the "sub-packages" 120, 220, 304 as shown in FIGS. 1, 2 and 3. Manufacturers, wholesalers or wireless communications service providers will provide wireless communication devices to an inventory management service. The inventory management service will store these devices in inventory at one or more DCs or will obtain them from manufacturers, vendors or other third parties as needed. These wireless communication devices are sent to the inventory management service ready for distribution to customers or the communications service provider may have facilities and personnel located within one or more DCs, or in close proximity to a DC, to program the wireless communication devices and prepare them for distribution. For example, if a customer's cellular telephone is being replaced, then the memory of the replacement cellular telephone may need to be programmed for the telephone number of the phone that it is replacing.

Orders for cellular communication devices are received by the inventory management service and passed to the information system of the DC. If the ordered devices are kept in the inventory of a DC, the orders are held by the order control function until released for fulfillment to an order picker function such as, for example, by wave-picking or other efficient warehouse picking techniques, as previously described in this document. The orders may be filled from inventory on-hand in the DC, inventory from another DC, inventory from a third-party such as, for example, a wholesaler or retailer, or inventory from a manufacturer or the communications service provider. The inventory management service may also utilize "cross-docking" techniques, as such techniques are known in the art, where orders are filled by inventory received at the "dock" of the DC and immediately distributed to fulfill orders at authorized outlet without ever being placed into the inventory of the DC. Once the orders are fulfilled, they are taken to a packaging area of the DC. One order may be comprised of one or more cellular communications devices (i.e., a bundle).

An identifier (i.e., a sub-package identifier) is associated with each order and a control device is created for each shipping container. The control device associates the sub-package identifier of each order contained within a shipping container with a customer identifier (e.g., name, employee ID, telephone number, etc.). As previously described, each customer is associated with an authorized outlet. The orders that are to be sent to a particular authorized outlet are consolidated into fewer shipping containers than there are orders for the authorized outlet. For example, if there are twenty cell phones destined to be shipped to Authorized Outlet #7, then all twenty cell phones may be placed into a single box or shipping container. If there are more orders destined for an authorized outlet than will fit into a single shipping container then additional shipping containers may be used.

Each shipping container is associated with a tracking identifier. The sub-package identifier of each order contained within a shipping container is linked with the container's tracking identifier. This allows each sub-package to be tracked and controlled as if it were an individual order.

The packaged wireless communications devices are shipped in their shipping containers to the respective authorized outlets via a commercial shipping service. An authorized outlet, as previously described, may be an attended or an unattended facility. If attended, the shipping containers are received by authorized outlet personnel and a control log is created that includes the customer identifier, the sub-package associated with that customer identifier, and a method of the customer or the customer's designee to acknowledge receipt of the sub-package. If there are discrepancies between the control device and the actual sub-packages, they will be handled as previously described. The sub-package is retrieved from the attended authorized outlet by the customer or the customer's designee. Acknowledgement of the receipt of the sub-package is made at the time of retrieval.

If the authorized outlet is an unattended facility, then the sub-packages are placed into a secure area of an unattended facility such that they may be retrieved by a customer having access to the secure area. Such an unattended system is described in the U.S. non-provisional patent application Ser. No. 10/285,115, previously referenced herein, APPENDIX B. The customer's gaining access to the secure area using a PIN or some other form of an access code provides acknowledgment of the customer's receipt of the sub-package contained within that secure area.

If a customer does not retrieve a sub-package within a certain pre-determined time period the customer may be charged a fee by the authorized outlet and the sub-package may be returned to the DC.

When retrieving a sub-package comprised of a wireless communication device, whether from an attended or unattended authorized outlet, the customer may be required to exchange an old wireless communication device for the new one. For example, a customer may be experiencing a problem with their present cell phone. The customer may contact the communications service provider. The communications service provider may in turn authorize replacement of the cell phone and either transfer the customer to the inventory management service or obtain information as to what authorized outlet the customer prefers to retrieve their new phone and return the old malfunctioning one and the customer's cell phone number (for programming the new phone). The new phone will be selected at the DC pursuant to business rules established between the inventory management service and the communication service provider, programmed and shipped to the authorized outlet indicated by the customer, all as previously described. In this example, the customer will not be allowed to retrieve the new cell phone until the old one has been returned. Control systems at the authorized outlet, whether attended or unattended, may prevent the distribution of the new wireless communication device until the old one has been surrendered. Return of the old wireless communication device may be as simple, for example, as surrendering the old phone to personnel at an attended authorized outlet or placing the old phone in a designated receptacle or secure area of an unattended authorized outlet.

The wireless communication device returned by the customer may be held by the authorized outlet until it can be aggregated with other returned wireless communication devices, consolidated into as few shipping containers as possible and return shipped to the DC. Once received at the DC, the returned devices may be repaired and returned to inventory, destroyed or recycled, sold, or returned to the communication service provider, manufacturer, or another third party.

FIG. 4 is an illustrative control device 400 that may be utilized in an embodiment of this invention. The control device 400 illustrated, for example, would be included in the consolidated package 302 as shipped to an authorized outlet 300 and links the customer identifier 402 (e.g., "Customer's Name") with the sub-package identifier 404, 406, 408 (e.g., "Order #1," "Order #2," and "Order #3). The control device 400 may also be used by the authorized outlet 300 as a control log (reference FIG. 5). The control device 400 is associated with a particular consolidated package 302 by including the tracking identifier 412 of the consolidated package 302 on the control device 400. In this embodiment, the account 410 is identified as well as the name of the shipping service provider 414, the level of service 416 (e.g., "ground," or "next day"), the number of bundles 418 contained within the consolidated package 302 that is associated with this control device 400 (used for billing purposes), (a "bundle" is one or more sub-packages within a consolidated package 302 that belong to one particular customer), and the authorized outlet to which this consolidated package is being shipped is identified 420. The illustrated control device 400 also includes a column for the recipient's signature to serve as acknowledgment of receipt 422 by the person who retrieves a bundle 308 or sub-package 304 that comprises a part of the consolidated package 302, and a date column 424 for the date the sub-package 304 or bundle 308 was retrieved.). Although only three columns are shown for sub-package identifiers 404, 406, 408, a customer identifier 402 may be associated with more than three sub-package identifiers by using multiple rows of the control device 400 in this embodiment. Likewise, multiple control device 400 sheets may be used for the same consolidated package 302 in this embodiment.

Generally, the information 402, 404, 406, 408, 410 412, 416, 418, 420 in this embodiment of the control device 400 is completed by personnel at the DC 312 and the control device 400 is inserted into the consolidated package's 402 shipping container. The acknowledgment of receipt 422 is made by the person retrieving the sub-package 304 or bundle 308, and the pick up date 424 is completed either by authorized outlet 300 personnel or the person retrieving the sub-package 304 or bundle 308. In other embodiments, the control device may be an electronic transmission such as, for example, an email that may be associated with a consolidated package 302 by the consolidated package's 302 tracking identifier. The control device 400 may also be generated by the warehouse management system.

FIG. 5 is an illustrative control log 500 that may be utilized in an embodiment of this invention. The control log 500 is either completed by authorized outlet 300 personnel at an attended authorized outlet and by IMS personnel at an unattended authorized outlet or the control device 400 is utilized by the authorized outlet 300 as a control log 500. As previously described, a control log 500 is used to record the disposition of a sub-package, including a customer acknowledging receipt of a sub-package. A customer's identifier 502 is associated with sub-package identifiers 504, 506, 508 (e.g., "Order #1," "Order #2" and "Order #3). Although only three columns are shown for sub-package identifiers, a customer may be associated with more than three sub-package identifiers by using multiple rows of the control log 500 in this embodiment. Likewise, multiple control log 500 sheets may be used for the same consolidated package 302 in this embodiment. A customer's receipt of a sub-package 304 from an authorized outlet is acknowledged in this embodiment by a signature 510. The date the sub-package is retrieved 512 is indicated as well as any storage fees 514 incurred because of a delayed retrieval. This particular embodiment also includes the authorized outlet number 516, the shipping service 518 that delivered the consolidated package 302, the date 520 the consolidated package 302 was received by the authorized outlet 300, the tracking identifier 522 of the consolidated package 302, the number of bundles 524 included in the consolidated package 302, the weight 526 of the consolidated package 302, the date 528 that unclaimed sub-packages would be returned to the DC and the ARS number 530 for return shipping and any fees 532 charged by the authorized outlet for return shipping. Although the shown embodiment of the control log is in paper form, it can be in many other various embodiments such as, for example, an electronic database coupled with an input device, etc.

FIG. 6 is an illustrative embodiment of a packing slip or manifest that may be used in an embodiment of the invention. The packing slip 600 may be automatically generated by the warehouse management system 210 or it can be manually created by personnel at the DC 200. The packing slip 400 is created for each order (sub-package) 220. The packing slip 600 for each order identifies the items that comprise the order 602, a customer identifier 604, a unique order number or sub-package identifier 606, the account 608, and a tracking identifier 610 of a shipping container in which the order will be consolidated with other orders for shipment to an identified authorized outlet 612. Though not shown in this particular embodiment, the packing slip 600 may also include machine-readable indicia such as, for example, barcodes, RFID tags, etc. that may be used for the tracking identifier 610, item numbers 602, customer identifier 604, sub-package identifier 606, account 608, authorized outlet 612, etc. The packing slip 600 is placed within the sub-package container so that it is visible without opening the container or is externally affixed to the sub-package container. This particular packing slip embodiment also depicts additional information 614 that may be used by the DC 200 in locating and shipping the sub-package.

Billing

In a preferred embodiment, an authorized outlet 300 is compensated by the IMS 208 for handling a consolidated package 302 based on the number of different customers 306 whose bundles 308 are included in the consolidated package 302 and that are distributed to the customer 306 that ordered the bundles 308, or that customer's designee. The authorized outlet 300 must show proof to the IMS 208 that the bundles 308 have been received by the intended recipients (i.e., customers), or that they were refused or incorrect and have been returned. This proof may be in the form of the control log 320 or information transferred from the authorized outlet's POS or inventory management system to the IMS 208. Proof of receipt may be shown by the recipient's signature (electronic or manual) on the control log 320. Proof of return may be indicated by a return tracking identifier 314 indicated on the control log 320. The authorized outlet 300 is reimbursed for returning unclaimed bundles 308. The IMS 208 will then invoice the accounts 110 for delivered bundles 308 and for costs incurred in the return of items, sub-packages 304 and bundles 308 when such return was not the fault of the IMS 208. The accounts 110 are invoiced separately by the shipping service 316 for ARS transportation costs, intelligent ARS transportation costs, or other return transportation costs. In other embodiments, the account 110 may receive only one invoice for the IMS 208 and shipping service 316 fees. These billing events may occur on a cyclical basis such as, for example, weekly, biweekly, monthly, etc.

Methods of Delivering Items

Figure 7:
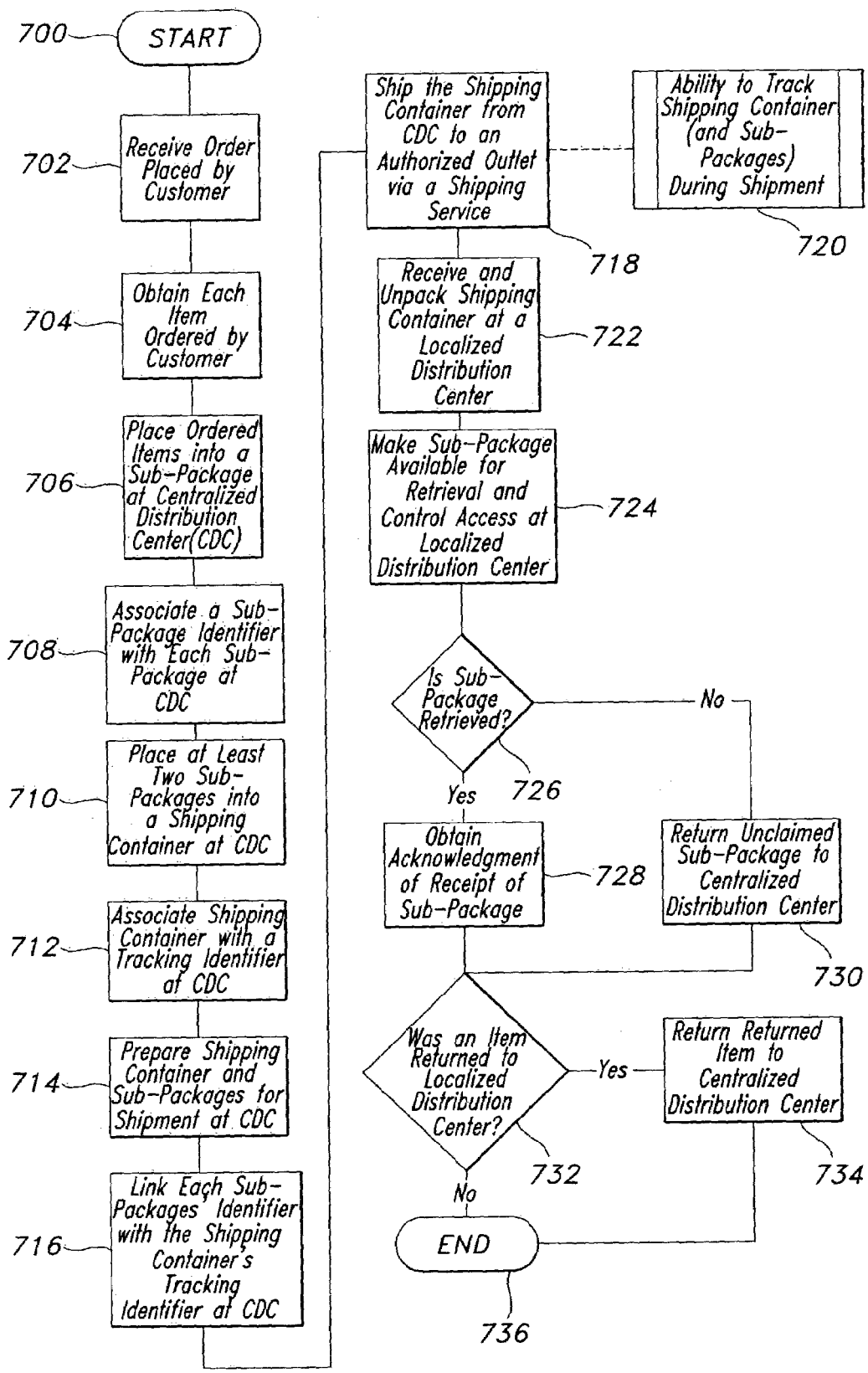
FIG. 7 is a flow chart of a method for delivering an item in an embodiment of the invention.

FIG. 7 is a flow chart for a method of distributing an item in an embodiment of this invention. Step 702 involves an IMS receiving an order comprised or one or more items placed by a customer. In Step 704, the IMS obtains each item ordered by the customer whether from on-hand inventory or from a third-party. In Step 706, each item ordered by the customer is placed into a sub-package. In Step 708, a sub-package identifier is associated with each sub-package. In Step 710, at least two sub-packages are placed into a shipping container. In Step 712, the shipping container is associated with a tracking identifier and in Step 714 the sub-packages and the shipping container are prepared for shipment. In Step 716, each sub-package identifier within the shipping container is linked with the shipping container's tracking identifier. This may be done manually (e.g. with a paper and pencil), electronically by scanning and the linking occurring on an electronic database, or automatically by the warehouse management system 210, or a combination thereof. In Step 718, the shipping container is shipped to an authorized outlet (i.e., a localized distribution center) via a shipping service and in Step 720, the shipping container along with the sub-packages contained therein, may be tracked during shipment. Step 722 involves the receiving and unpacking the shipping container at the localized distribution center. In Step 724, the sub-packages are made available for retrieval at the localized distribution center, however, access to the sub-package is controlled. Step 726 involves determining whether the sub-package is retrieved; if it is retrieved (Step 728) then acknowledgment of the sub-package's receipt is obtained; if it is not retrieved (Step 730) then it is shipped back to the centralized distribution center after a predetermined time period. Step 732 determines whether a customer exchanges an item for a new one; if an old item is exchanged (Step 734), then the old item may be return-shipped from the localized distribution center to a centralized distribution center. If no item is exchanged then the process is ended (Step 736). The described method of distributing an item is possible with a multitude of items, including, for example, service parts and wireless communication devices.

Figure 8:
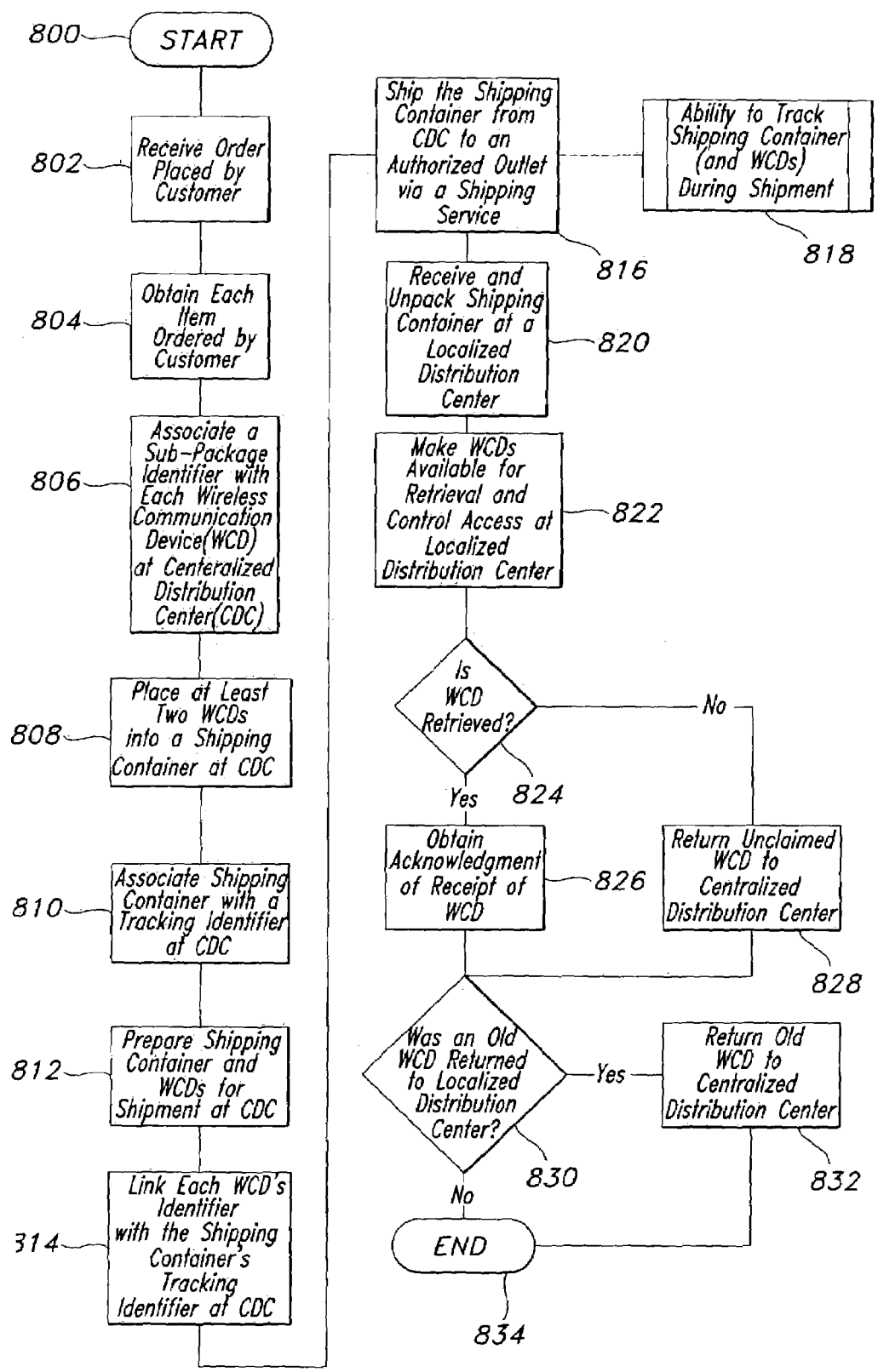
FIG. 8 is a flow chart of a method for delivering a wireless communication device in an embodiment of the invention.

FIG. 8 is a flow chart for a method for distributing a wireless communication device in an embodiment of the invention. Step 802 involves an IMS, a wireless communication provider, a wireless communication device manufacturer, etc. (a "provider") receiving an order comprised or one or more wireless communication devices placed by a customer. In Step 804, the Provider obtains each wireless communication device ordered by the customer whether from on-hand inventory or from a third-party. In Step 806, a sub-package identifier is associated with each wireless communication device. In Step 808, at least two wireless communication devices are placed into a shipping container. In Step 810 the shipping container is associated with a tracking identifier and in Step 812 the wireless communication devices and the shipping container are prepared for shipment. In Step 814, each sub-package identifier within the shipping container is linked with the shipping container's tracking identifier. This may be done manually (e.g. with a paper and pencil), electronically by scanning and the linking occurring on an electronic database, automatically by the warehouse management system, or a combination thereof. In Step 816, the shipping container is shipped to an authorized outlet (i.e., a localized distribution center) via a shipping service and in Step 818 the shipping container, along with the wireless communication devices contained therein, may be tracked during shipment. Step 820 involves the receiving and unpacking the shipping container at the localized distribution center; and in Step 822 access to the wireless communication device is controlled at the localized distribution center and the wireless communication device is made available for retrieval. Step 824 involves determining whether the wireless communication device is retrieved from the localized distribution center. If the wireless communication device is retrieved (Step 826), then acknowledgment of the receipt of each wireless communication device is obtained. If the wireless communication device is not retrieved within a predetermined time period (Step 828), then it is returned to the centralized distribution center. Step 830 determines whether a customer exchanges a wireless communication device for a new one. If there is an exchange (Step 832), then the old wireless communication device may be return-shipped from the localized distribution center to a centralized distribution center.

Figure 9:
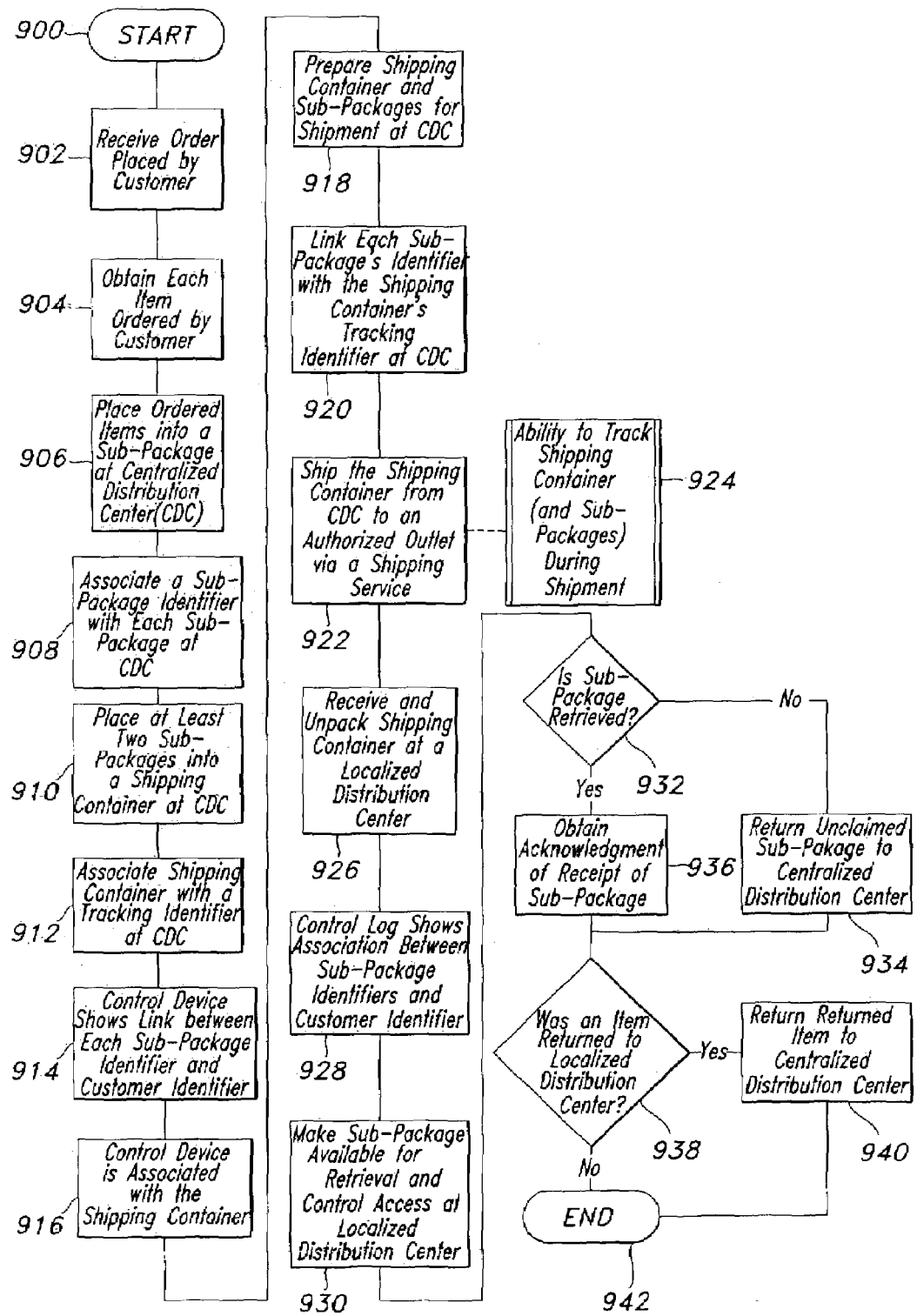
FIG. 9 is a flow chart of a method for delivering an item in embodiment of the invention.

FIG. 9 is another flow chart for a method of distributing an item in an embodiment of this invention. Step 902 involves an IMS receiving an order comprised or one or more items placed by a customer. In Step 904, the IMS obtains each item ordered by the customer whether from on-band inventory or from a third-party. In Step 906, each item ordered by the customer is placed into a sub-package. In Step 908, a sub-package identifier is associated with each sub-package. In Step 910, at least two sub-packages are placed into a shipping container. In Step 912 the shipping container is associated with a tracking identifier. In Step 914, each sub-package within the shipping container is shown with the customer identifier of the customer that ordered the sub-package through a control device and in Step 916 the control device is associated with that shipping container. In Step 918 the sub-packages and the shipping container are prepared for shipment. In Step 920, each sub-package identifier within the shipping container is linked with the shipping container's tracking identifier. This may be done manually (e.g. with a paper and pencil), electronically by scanning and the linking occurring on an electronic database, electronically by the warehouse management system, or a combination thereof. In some instances, this linking may occur as soon as the orders are accumulated in the warehouse management system and are released for "picking." In Step 922, the shipping container is shipped to an authorized outlet (i.e., a localized distribution center) via a shipping service and in Step 924 the shipping container, along with the sub-packages contained therein, may be tracked during shipment. Step 926 involves the receiving and unpacking the shipping container at the localized distribution center. In Step 928 the sub-package identifier is shown with the customer identifier of the customer that ordered the sub-package with a control log. The control device of Step 914 may be used as the control log. In Step 930 access to the sub-package is controlled at the localized distribution center and the sub-package is made available for retrieval. In Step 932 it is determined whether the sub-package is retrieved within a predetermined period of time. If it is not retrieved (Step 934), then the unclaimed sub-package is returned to the centralized distribution center. If it is retrieved (Step 936), then acknowledgment of the receipt of the sub-package is obtained on the control log. Step 938 determines whether the customer returned an item to the localized distribution center when retrieving the sub-package. If so (Step 940), then the old item may be return-shipped from the localized distribution center to a centralized distribution center. The described method of distributing an item is possible with a multitude of items, including, for example, service parts and wireless communication devices.

Therefore, what is described are systems and methods for the selection, aggregation, sortation, consolidation, shipment, tracking, control, and distribution of items ordered by a customer and the return of items that are exchanged for new or replacement devices.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of distributing items, said method comprising:
   obtaining each item listed in a first order of one or more items, said first order being associated with a first customer;
   obtaining each item listed in a second order of one or more items, said second order being associated with a second customer;
   placing each item from the first order into a first sub-package;
   associating a first sub-package identifier with the first sub-package;
   associating a first customer identifier with the first sub-package identifier, the first customer identifier being associated with the first customer;
   placing each item from the second order into a second sub-package;
   associating a second sub-package identifier with the second sub-package;
   associating a second customer identifier with the second sub-package identifier, the second customer identifier being associated with the second customer;
   placing the first and second sub-packages into a consolidated package that is associated with a consolidated package tracking identifier;
   associating the first and second sub-package identifiers with the consolidated package tracking identifier;
   shipping the consolidated package to a localized distribution center;
   while executing said step of shipping the consolidated package, tracking the shipment of the consolidated package to the localized distribution center;
   receiving and unpacking the consolidated package at the localized distribution center;
   controlling access to the first and second sub-packages at the localized distribution center;
   making the first sub-package available to the first customer for retrieval at the distribution center; and
   making the second sub-package available to the second customer for retrieval at the distribution center.

2. The method of claim 1, wherein said method further comprises:
   obtaining acknowledgement of receipt from the first customer upon retrieval of the respective sub-package; and
   obtaining acknowledgement of receipt from the second customer upon retrieval of the respective sub-package.

3. The method of claim 1 further comprising the steps of:
   displaying the association between the first sub-package identifier and the first customer identifier on a control device; and
   displaying the association between the second sub-package identifier-and the second customer identifier on the control device, wherein the control device is associated with the consolidated package.

4. The method of claim 3, further comprising the steps of:
   displaying the association between the first sub-package identifier to the first customer identifier on a control logs;
   displaying the association between the second sub-package identifier to the second customer identifier on a control log;
   obtaining acknowledgement of receipt of the first sub-package on the control log; and
   obtaining acknowledgement of receipt of the second sub-package on the control log.

5. The method of claim 4, wherein the control device is used as the control log.

6. The method of claim 1, wherein the first sub-package identifier, the second sub-package identifier, and the tracking identifier comprise machine-readable indicia.

7. The method of claim 1, wherein the first sub-package identifier, the second sub-package identifier, and the tracking identifier comprise human-readable indicia.

8. The method of claim 1, wherein the first sub-package identifier, the second sub-package identifier, and the tracking identifier comprise both machine-readable and human-readable indicia.

9. The method of claim 1, further comprising the steps of:
   returning the first sub-package to a centralized distribution center through a return system if the first sub-package is not retrieved within a designated period of times; and
   returning the second sub-package to the centralized distribution center through the return system if the second sub-package is not retrieved within the designated period of time.

10. The method of claim 9, further comprising the step of:
    providing a return shipping authorization by the inventory management service to be used by the localized distribution center to return unretrieved sub-packages to the centralized distribution center.

11. The method of claim 1, further comprising the steps of:
receiving a third order comprising one or more items, said third order being associated with the second customer;
obtaining each item from the third order;
placing each item from the third order into a third sub-package;
associating a third sub-package identifier with the third sub-package;
associating the second customer identifier with the third sub-package identifier;
placing the third sub-packages into the consolidated package;
associating the third sub-package identifier with the consolidated tracking identifier;
controlling access to the third sub-package at the localized distribution center; and
making the third sub-package available to the second customer for retrieval at the distribution center.

12. The method of claim 1, wherein the associating between the first sub-package identifier and first customer identifier and the associating between the second sub-package identifier and second customer identifier is accomplished via a computer system.

13. The method of claim 1, wherein the associating between the first sub-package identifier and the consolidated package tracking identifier and the associating between the second package identifier and the consolidated package tracking identifier is accomplished via a computer system.

14. The method of claim 1, wherein the tracking of the shipment of the consolidated package to the localized distribution center is accomplished by utilizing the first customer identifier, the second customer identifier, the first sub-package identifier, the second sub-package identifier, the consolidated package tracking identifier, or any combination thereof.

15. The method of claim 1, wherein the tracking step is performed by an inventory management service, the localized distribution center, the first and second customer, or any combination thereof.

16. A method of distributing service parts, said method comprising:
obtaining each service part listed in a first order of one or more service parts, said first order being associated with a first customer;
obtaining each service part listed in a second order of one or more service parts, said second order being associated with a second customer;
placing each service part from the first order into a first sub-package;
associating a first sub-package identifier with the first sub-package;
associating a first customer identifier with the first sub-package identifier, the first customer identifier being associated with the first customer;
placing each service part of the second order into a second sub-package;
associating a second sub-package identifier with the second sub-package;
associating a second customer identifier with the second sub-package identifier, the second customer identifier being associated with the second customer;
placing the first and second sub-packages into a consolidated package that is associated with a consolidated package tracking identifier;
associating the first and second sub-package identifiers with the consolidated package tracking identifier;
shipping the consolidated package to a localized distribution center;
while executing said step of shipping the consolidated package, tracking the shipment of the consolidated package to the localized distribution center;
receiving and unpacking the consolidated package at the localized distribution center;
controlling access to the first and second sub-packages at the localized distribution center;
making the first sub-package available to the first customer for retrieval at the distribution center; and
making the second sub-package available to the second customer for retrieval at the distribution center.

17. The method of claim 16, further comprising the steps of:
displaying the association between the first sub-package identifier and the first customer identifier on a control device; and
displaying the association between the second sub-package identifier and the second customer identifier on the control device, wherein the control device is associated with the consolidated package.

18. The method of claim 17, farther comprising the steps of:
displaying the association between the first sub-package identifier and the first customer identifier on a control log;
displaying the association between the second sub-package identifier and the second customer identifier on the control log;
obtaining acknowledgement of receipt of the first sub-package on the control log; and
obtaining acknowledgement of receipt of the second sub-package on the control log.

19. The method of claim 18, wherein the control device is used as the control log.

20. The method of claim 16, wherein the first sub-package identifier, the second sub-package identifier, and the tracking identifier comprise machine-readable indicia.

21. The method of claim 16, wherein the first sub-package identifier, the second sub-package identifier, and the tracking identifier comprise human-readable indicia.

22. The method of claim 16, wherein the first sub-package identifier, the second sub-package identifier, and the tracking identifier comprise both machine-readable and human-readable indicia.

23. The method of claim 16, further comprising the steps of:
returning the first sub-package to a centralized distribution center through a return system if the first sub-package is not retrieved within a designated period of times; and
returning the second sub-package to the centralized distribution center through the return system if the second sub-package is not retrieved within the designated period of time.

24. The method of claim 23, further comprising the step of:
providing a return shipping authorization by an inventory management service to be used by the localized distribution center to return unretrieved sub-packages to the centralized distribution center.

25. A method for distributing wireless communication devices, comprising:
obtaining each wireless communication device listed in a first order of one or more wireless communication devices, said first order being associated with a first customer;

obtaining each wireless communication device listed in a second order of one or more wireless communication devices, said second order being associated with a second customer;

association a first device identifier with the first wireless communication device;

associating a first customer identifier with the first device identifier, the first customer identifier being associated with the first customer;

associating a second device identifier with the second wireless communication device;

associating a second customer identifier with the second device identifier, the second customer identifier being associated with the second customer;

placing the first and second wireless communication devices into a consolidated package that is associated with a consolidated package tracking identifier;

associating the first and second device identifiers with the consolidated package tracking identifier;

shipping the consolidated package to a localized distribution center;

while executing said step of shipping the consolidated package, tracking the shipment of the consolidated package to the distribution center;

receiving and unpacking the consolidated package at the localized distribution center;

controlling access to the first and second wireless communication devices at the localized distribution center;

making the first wireless communication device available to the first customer for retrieval; and making the second wireless communication device available to the second customer for retrieval.

26. The method of claim 25, farther comprising the steps of:
displaying the association between the first device identifier to the first customer identifier on a control device; and
displaying the association between the second device identifier to the second customer identifier on a control device, wherein the control device is associated with the consolidated package.

27. The method of claim 26, further comprising the steps of:
displaying the association between the first device identifier and the first customer identifier on a control log;
displaying the association between the second device identifier and the second customer identifier on the control log;
obtaining acknowledgement of receipt of the first wireless communication device on the control logs; and
obtaining acknowledgement of receipt of the first wireless communication device on the control log.

28. The method of claim 27, wherein the control device is used as the control log.

29. The method of claim 25, wherein the first device identifier, the second device identifier, and the tracking identifier comprise machine-readable indicia.

30. The method of claim 25, wherein the first device identifier, the second device identifier, and the tracking identifier comprise human-readable indicia.

31. The method of claim 25, wherein the first device identifier, the second device identifier, and the tracking identifier comprise both machine-readable and human-readable indicia.

32. The method of claim 25, further comprising the steps of:
returning the first wireless communication device to a centralized distribution center through a return system if the first wireless communication device is not retrieved within a designated period of time; and
returning the second wireless communication device to the centralized distribution center through the return system if the wireless communication device is not retrieved within the designated period of time.

33. The method of claim 32, further comprising the step of:
providing a return shipping authorization by an inventory management service to be used by the localized distribution center to return unretrieved wireless communication devices to the centralized distribution center.

34. The method of claim 25, further comprising the step of:
returning an exchanged wireless communication device left at the localized distribution center to the centralized distribution center through a return system.

35. The method of claim 25, further comprising:
obtaining acknowledgement of receipt from the first customer upon retrieval of the respective wireless communication device; and
obtaining acknowledgement of receipt from the second customer upon retrieval of the respective wireless communication device.

36. A method of distributing one or more items, said method comprising:
obtaining each item listed in a first order of one or more items, said first order being associated with a first customer;
obtaining each item listed in a second order of one or more items, said second order being associated with a second customer;
placing each item from the first order into a first sub-package;
associating a first sub-package identifier with the first sub-package;
associating a first customer identifier with the first sub-package identifier, the first customer identifier being associated with the first customer;
placing each item of the second order into a second sub-package;
associating a second sub-package identifier with the second sub-package;
associating a second customer identifier with the second sub-package identifier, the second customer identifier being associated with the second customer;
placing the first and second sub-packages into a consolidated package that is associated with a consolidated package tracking identifier;
associating the first and second sub-package identifiers with the consolidated package tracking identifier;
showing the association between first and second sub-package identifiers to the first and second customer identifiers on a control device and associating the control device with the consolidated package;
shipping the consolidated package to a localized distribution center;
while executing said step of shipping the consolidated package, tracking the shipment of the consolidated package to the distribution center;
receiving and unpacking the consolidated package at the localized distribution center;
showing the association between the first and second sub-package identifiers to the first and second customer identifiers on a control log;
controlling access to the first and second sub-packages at the localized distribution center;

making the first sub-package available to the first customer for retrieval; and making the second sub-package available to the second customer for retrieval.

37. The method of claim 36, wherein the first sub-package identifier, the second sub-package identifier, and the tracking identifier comprise machine-readable indicia.

38. The method of claim 36, wherein the first sub-package identifier, the second sub-package identifier, and the tracking identifier comprise human-readable indicia.

39. The method of claim 36, wherein the first sub-package identifier, the second sub-package identifier, and the tracking identifier comprise both machine-readable and human-readable indicia.

40. The method of claim 36, further comprising the steps of:

returning the first sub-package to a centralized distribution center through a return system if the first sub-package is not retrieved within a designated period of time; and returning the second sub-package to the centralized distribution center through the return system if the second sub-package is not retrieved within the designated period of time.

41. The method of claim 36, further comprising the step of:

providing a return shipping authorization by the inventory management service to be used by the localized distribution center to return un-retrieved sub-packages to the centralized distribution center.

42. The method of claim 36, further comprising the step of:

returning an item left at the localized distribution center to the centralized distribution center through a return system.

43. The method of claim 42, wherein the control device is used as the control log.

44. The method of claim 36, further comprising:

obtaining acknowledgement of receipt on the control log from the first customer upon retrieval of the respective sub-package; and obtaining acknowledgement of receipt on the control log from the second customer upon retrieval of the respective sub-package.

45. A method of distributing items, said method comprising:

at a centralized distribution center, obtaining each item listed in a first order of one or more items, said first order being associated with a first customer;

at a centralized distribution center, obtaining each item listed in a second order of one or more items, said second order being associated with a second customer;

placing each item from the first order into a first sub-package;

associating a first sub-package identifier with the first sub-package;

associating a first customer identifier with the first sub-package identifier, the first customer identifier being associated with the first customer;

placing each item of the second order into a second sub-package;

associating a second sub-package identifier with the second sub-package;

associating a second customer identifier with the second sub-package identifier, the second customer identifier being associated with the second customer;

placing the first and second sub-packages into a consolidated package that is associated with a consolidated package tracking identifier;

associating the first and second sub-package identifiers with the consolidated package tracking identifier;

shipping the consolidated package to a localized distribution center, while executing said step of shipping the consolidated package, tracking the shipment of the consolidated package to the distribution center;

receiving and unpacking the consolidated package at the localized distribution center;

controlling access to the first and second sub-packages at the localized distribution center;

making the first and second sub-packages available to the first and second customers for retrieval from the distribution center, and in response to the first and second sub-packages remaining unclaimed for a time period in excess of a pre-determined time period:

(A) placing the first and second sub-packages into a consolidated return package that is associated with a return tracking identifier;

(B) associating the first and second sub-package identifiers with the return tracking identifier;

(C) shipping the consolidated return package back to the centralized distribution center; and (D) tracking the consolidated return package while the consolidated return package is being shipped to the centralized distribution center.

46. The method of claim 45, further comprising associating the return tracking identifier to the tracking identifier.

47. The method of claim 45, further comprising providing a return shipping authorization to return the first and second sub-packages in the consolidated return package to the centralized distribution center.

* * * * *

UNITED STATES PATENT AND TRADEMARK OFFICE
CERTIFICATE OF CORRECTION

PATENT NO. : 7,426,484 B2
APPLICATION NO. : 10/357971
DATED : September 16, 2008
INVENTOR(S) : Joyce et al.

It is certified that error appears in the above-identified patent and that said Letters Patent is hereby corrected as shown below:

Column 2,
Line 28, "Modelfor" should read --Model for--.

Column 10,
Line 1, "maybe" should read --may be--.

Column 22,
Line 52, "on-band" should read --on-hand--.

Column 27,
Line 33, "farther" should read --further--.

Signed and Sealed this

Sixth Day of January, 2009

JON W. DUDAS
*Director of the United States Patent and Trademark Office*